US009317810B2

(12) United States Patent
Rigdon et al.

(10) Patent No.: US 9,317,810 B2
(45) Date of Patent: Apr. 19, 2016

(54) INTELLIGENCE ANALYSIS

(75) Inventors: Debra A. Rigdon, Kent, WA (US);
Timothy A. Tibbetts, Renton, WA (US)

(73) Assignee: The Boeing Company, Chicago, IL (US)

( * ) Notice: Subject to any disclaimer, the term of this patent is extended or adjusted under 35 U.S.C. 154(b) by 937 days.

(21) Appl. No.: 13/559,485

(22) Filed: Jul. 26, 2012

(65) Prior Publication Data
US 2015/0286951 A1    Oct. 8, 2015

(51) Int. Cl.
G06F 9/44 (2006.01)
G06N 7/02 (2006.01)
G06N 7/06 (2006.01)
G06N 7/00 (2006.01)
G06N 5/04 (2006.01)

(52) U.S. Cl.
CPC . *G06N 7/005* (2013.01); *G06N 5/04* (2013.01)

(58) Field of Classification Search
USPC .......................................................... 706/52
See application file for complete search history.

(56) References Cited

U.S. PATENT DOCUMENTS

| 7,904,512 B2 | 3/2011 | Goldberg et al. | |
|---|---|---|---|
| 7,944,357 B2 | 5/2011 | Hodges | |
| 8,019,712 B2 * | 9/2011 | Rigdon | G06N 5/04 706/46 |
| 8,051,088 B1 * | 11/2011 | Tibbetts | G06F 17/2785 704/7 |
| 9,135,600 B2 * | 9/2015 | Rigdon | G06Q 50/01 |
| 2005/0190061 A1 | 9/2005 | Trela | |
| 2006/0206942 A1 | 9/2006 | Sweet | |
| 2006/0224898 A1 | 10/2006 | Ahmed | |
| 2006/0229902 A1 | 10/2006 | McGovern et al. | |
| 2007/0236330 A1 | 10/2007 | Cho et al. | |
| 2009/0043812 A1 * | 2/2009 | Rigdon | G07C 9/00166 |
| 2009/0192962 A1 * | 7/2009 | Rigdon | G06N 5/04 706/46 |
| 2013/0325947 A1 * | 12/2013 | Rigdon | G06Q 50/01 709/204 |
| 2015/0286951 A1 * | 10/2015 | Rigdon | G06N 7/005 706/52 |

FOREIGN PATENT DOCUMENTS

WO    2006050245 A2    5/2006

OTHER PUBLICATIONS

A case study of a presence based end-user lookup service for the dynamic discovery of entities across technologies and domains Zhongwen Zhu; Belqasmi, F.; Chunyan Fu; Glitho, R. Communications Magazine, IEEE Year: 2010, vol. 48, Issue: 11 pp. 82-89, DOI: 10.1109/MCOM.2010.5621972 IEEE Journals & Magazines.*

(Continued)

*Primary Examiner* — Michael B Holmes
(74) *Attorney, Agent, or Firm* — Toler Law Group, PC

(57) ABSTRACT

A particular method includes receiving a data element at a processor of a computing device and determining whether the received data element is related to a known data set corresponding to one or more known data elements stored in a memory accessible to the processor. The method further includes, when the received data element is related to a particular known data set, forming an aggregate data set by combining the received data element with the particular known data set. The method also includes evaluating one or more analysis templates based on the aggregate data set. Each analysis template corresponds to a different hypothesis. Evaluating the one or more analysis templates results in a determination regarding a probability that a particular hypothesis is true based on the aggregate data set.

30 Claims, 11 Drawing Sheets

(56) References Cited

OTHER PUBLICATIONS

Simulating an indoor ultra wideband channel based on a niching particle swarm optimizer Yifan Chen; Dubey, V.K. Advances in Wired and Wireless Communication, 2005 IEEE/Sarnoff Symposium on Year: 2005 pp. 57-60, DOI: 10.1109/SARNOF.2005. 1426511 IEEE Conference Publications.*

A Novel Lookup Service Enabler for Presence-Based Applications and Its Architecture in the 3GPP IP Multimedia Subsystem Zhongwen Zhu; Belqasmi, F.; Chunyan Fu; Glitho, R. New Technologies, Mobility and Security (NTMS), 3rd Intl. Conf. on Year: 2009 pp. 1-6, DOI: 10.1109/NTMS.2009.5384837 IEEE Conference Publications.*

Semi-supervised Learning of Geospatial Objects through Multimodal Data Integration Yi Yang; Newsam, S. Pattern Recognition (ICPR), 2014 22nd International Conference on Year: 2014 pp. 4062-4067, DOI: 10.1109/ICPR.2014.696 IEEE Conference Publications.*

Lewis, L., "Biometrics for Secure Identity Verification: Trends and Developments", INSS 690 Professional Seminar, Bowie State University, Maryland, Term 3, approved Jan. 26, 2002, http://web.archive/org/web/20040711131147/http://faculty.ed.umuc.edu/~meinkej/inss690/lewis.pdf, 26 pages.

International Search Report and Written Opinion of the International Search Authority for International Application No. PCT/US2013/049463, mailed on Jun. 3, 2014, 12 pages.

Boicu, M. et al., "Cognitive Assistants for Evidence-Based Reasoning Tasks", AAAI Fall Symposium on Advances in Cognitive Systems, Nov. 2011, 8 pages.

Johnson, J. et al., "Law Enforcement Ontology for Identification of Related Information of Interest Across Free Text Documents", 2011 European Intelligence and Security Informatics Conference, IEEE Computer Society, Sep. 2011, pp. 19-27.

International Preliminary Report on Patentability for International Application No. PCT/US2013/049463, mailed on Jan. 27, 2015; 7 pages.

* cited by examiner

INTELLIGENCE ANALYSIS

FIELD OF THE DISCLOSURE

The present disclosure is generally related to intelligence analysis.

BACKGROUND

Advances in technology have significantly improved intelligence data gathering in recent years. However, analysis of gathered data remains a relatively burdensome, often manual, task. As more data becomes available, data intelligence analysis is expected to become even more burdensome.

SUMMARY

Embodiments disclosed herein enable real-time intelligence analysis regarding persons, groups of persons and associated objects and locations. Particular embodiments use templates to evaluate gathered data. The templates include embedded analysis instructions that enable the templates to evaluate hypotheses to explain the gathered data in a manner that is designed to simulate an evaluation that would be performed by a human intelligence analyst.

In a particular embodiment, a method of data analysis includes receiving a data element at a processor of a computing device. The method also includes determining, using the processor, whether the received data element is related to a known data set corresponding to one or more known data elements stored in a memory accessible to the processor. The method further includes, when the received data element is related to a particular known data set, forming an aggregate data set by combining the received data elements with the particular known data set. The method also includes evaluating, using the processor, one or more analysis templates based on the aggregate data set. Each analysis template corresponds to a hypothesis related to the aggregate data set. Evaluating the one or more analysis templates results in a determination regarding a probability that a particular hypothesis is true based on the aggregate data set.

In another embodiment, a computer-readable medium includes instructions that are executable by a processor to cause the processor to determine whether a received data element is related to a known data set corresponding to one or more known data elements stored in a memory accessible to the processor. The instructions are also executable by the processor to form an aggregate data set by combining the received data element with a particular known data set when the received data element is related to the particular known data set. The instructions are also executable by the processor to evaluate one or more analysis templates based on the aggregate data set. Each analysis template corresponds to a hypothesis related to the aggregate data set. Evaluating the one or more analysis templates results in a determination regarding a probability that a particular hypothesis is true based on the aggregate data set.

In another embodiment, a system includes a processor and a memory accessible to the processor. The memory stores instructions that are executable by the processor to cause the processor to determine whether a received data element is related to a known data set corresponding to one or more known data elements stored in the memory. The instructions are also executable by the processor to form an aggregate data set by combining the received data element with a particular known data set when the received data element is related to the particular known data set. The instructions are also executable by the processor to evaluate one or more analysis templates based on the aggregate data set. Each analysis template corresponds to a hypothesis related to the aggregate data set. Evaluating the one or more analysis templates results in a determination regarding a probability that a particular hypothesis is true based on the aggregate data set.

Accordingly, embodiments disclosed herein enable automated, real-time, and possibly continuous, intelligence analysis regarding persons, groups of persons and associated objects and locations. The features, functions, and advantages that are described herein can be achieved independently in various embodiments or may be combined in yet other embodiments, further details of which are disclosed with reference to the following description and drawings.

DETAILED DESCRIPTION

Embodiments disclosed herein enable real-time intelligence analysis regarding persons, groups of persons and associated objects and locations. The assessment includes evaluations of relevant inanimate objects, such as documents, weapons, chemicals, maps, tools, etc. The assessment may also include evaluation of behavioral and observational data such as is typically used by law enforcement professionals monitoring an area. In a particular embodiment, current information (e.g., information from current questioning, a recently received report or live data feed) and historical information (e.g., data records of past activity, intelligence databases, associations, etc.) are correlated to make an assessment of potential for or risk of future negative actions and to develop a ranked set of possible explanations for current observed behaviors. The assessment may also, or in the alternative, be useful to guide additional information collection. The intelligence analysis (performed by a computer) may be performed in a manner that simulates or models intelligence analysis performed by a human analyst by use of templates that model assessment patterns used by expert human analysts.

During the intelligence analysis, individuals or groups of individuals are evaluated to determine whether they pose a threat or might be useful in some manner (e.g., are affiliated with another party of interest, are a potential source of information, etc.). The evaluation may be triggered by receipt of new information related to the individual, related to the group of individuals, related to an object (e.g., an object associated with the individual or group), related to a location (e.g., a location associated with the individual or group), or a combination thereof. A computing system implementing the intelligence analysis, referred to herein as an intelligence analyzer, may correlate the new information with historical knowledge (e.g., past activity, intelligence databases, associations, etc.) to update the intelligence analyzer's current knowledge based on the new information. An initial evaluation based on the new information may result in a deeper (e.g., more thorough or complete) understanding of the individual or group, which may enable prediction of behaviors or intent, generation of explanations for observed behaviors, analysis of threat potential or hostility, analysis of involvement in nefarious activity, recognition of unusual or anomalous behavior, or a combination thereof.

As analyses are performed, the intelligence analyzer learns new information (e.g., gathers and assesses) about the individuals, groups, objects and locations being evaluated. The new information (including data received from external sources as well as hypotheses and conclusions determined by the intelligence analyzer) may be stored in a memory so that the new information can be used for future evaluations.

Figure 1:
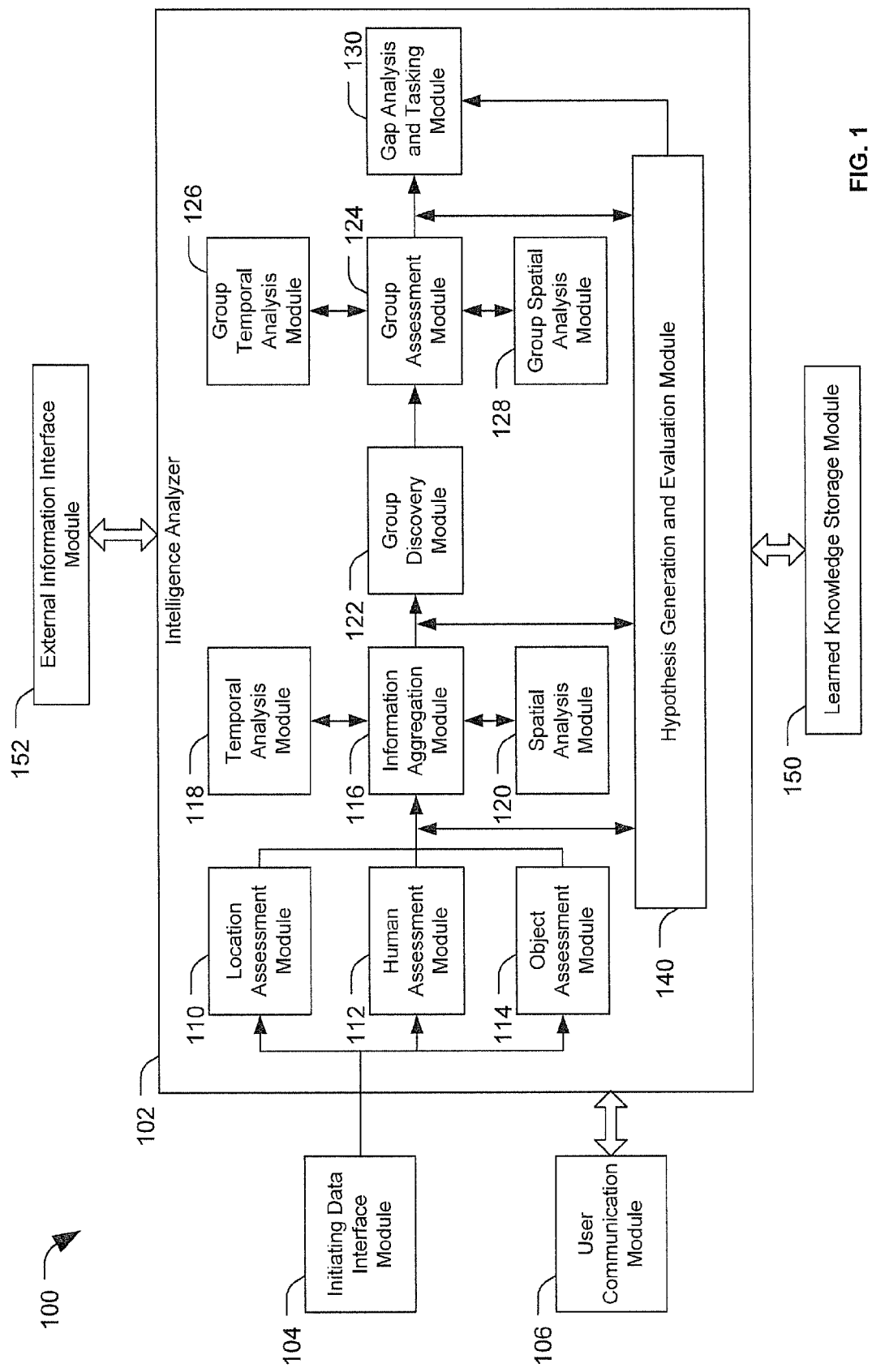
FIG. 1 is a block diagram illustrating a particular embodiment of an intelligence analysis system.

FIG. 1 is a block diagram illustrating a particular embodiment of an intelligence analysis system 100. The intelligence analysis system 100 is illustrated and described in terms of functional modules. In various embodiments, one or more of the functional modules may be implemented using software instructions executed by one or more processors, using hardware that is configured to implement the functions of a particular module, using firmware, or a combination thereof. In a particular embodiment, the functional modules are application-specific software modules. One or more of the functional modules may include computational code (e.g., Bayesian computations to determine belief values, likelihood, etc.), action code (e.g., database query code, text parsing, etc.), general application framework (e.g., to start up and shut down the application), or a combination thereof.

The functional modules of the intelligence analysis system 100 may include an initiating data interface module 104. The initiating data interface module 104 enables reception of a data element or data elements of interest. The data element may include or be included within, for example, a request by a user, an intelligence report, a feed received from another system (e.g., a really simple syndication (RSS) news report, an electronic message, a video or audio stream, etc.), a result of directed data mining, or a combination thereof. The data element may be related to a person (or persons), an object, or a location. The initiating data interface module 104 may also be operable to receive general or background data, such as a current date, time of day, weather data, or other data that is not tied to a particular individual, object or location and that may be used for particular analyses. The initiating data interface module 104 may perform initial evaluation of a new data element to determine how to route the new data element for initial processing by assessment modules of the intelligence analysis system 100.

In a particular embodiment, the initiating data interface module 104 converts the information that is received into an appropriate structure for processing. For example, the initiating data interface module 104 may receive structured information, unstructured information, or both. Structured information refers to information that is arranged in a manner that facilitates automated processing and analysis. For example, structured information may include data fields and attributes that are arranged in a known or easily determinable manner. Unstructured information refers to information that is not arranged in a manner that facilitates automated processing and analysis. For example, unstructured information may include raw images, human generated text (e.g., news articles, electronic messages, etc.), other information that is not specifically arranged to facilitate processing by a computing device, or a combination thereof. If information received by the initiating data interface module 104 is unstructured, the initiating data interface module 104 may process (e.g., parse and/or task a specialized evaluation tool) the information to extract attributes for further analysis and arrange the attributes in a structured data element for use by other modules of the intelligence analysis system 100.

The functional modules of the intelligence analysis system 100 may include a human assessment module 112. The human assessment module 112 may perform initial processing of new data elements that are related to an individual or group of individuals. If the new data element is related to a group, then an assessment is initiated for each member of the group, which results in multiple evaluation tasks for the human assessment module 112. The human assessment module 112 may be operable to perform evaluations for multiple individuals in parallel. Each evaluation may be performed independently of other evaluations. Alternately, two or more of the evaluations may be inter-related. For example, when a first evaluation causes a search for particular data to be performed, the particular data may also be provided to a second evaluation, if the particular data is relevant to the second evaluation. To illustrate, when two individuals, including a first individual and a second individual, are stopped in a vehicle, separate evaluations may be initiated related to each individual. During evaluation of the first individual, a history of drug smuggling may be identified, which may cause a hypothesis that the vehicle is being used for drug smuggling to be initiated. Ownership records associated with the vehicle may be used to evaluate whether the vehicle is being used for drug smuggling. Accordingly, a task may be generated to identify ownership records of the vehicle. When the ownership records for the vehicle are received, the ownership records for the vehicle may be used for the evaluation of the first individual and may also be used to update data being used for the evaluation of the second individual.

To evaluate a new data element related to a particular individual, the human assessment module 112 may access data sources, such as a local learned knowledge storage module 150, an external information interface module 152, or both, to acquire additional information related to the particular individual. The learned knowledge storage module 150 includes or provides access to a local database or a set of local databases. The external information interface module 152 includes or provides access to other evaluation tools, and remote data sources, including other intelligence databases and public databases, such as internet search engines, news sources, other websites, and so forth.

The new data element and information acquired from the data sources may be used to update previously known information by updating the learned knowledge storage module 150. Additionally, the new data element and the information acquired from the data sources may be used to perform evaluations regarding the particular individual. Examples of evaluations that may be performed regarding the particular individual include attempting to determine an identity of the particular individual, attempting to generate explanations for behaviors and actions of the particular individual, attempting to interpret intent (e.g., goals and motives) of the particular individual, and re-evaluating and/or updating profiles associated with the particular individual. If the particular individual was not previously known (e.g., the learned knowledge storage module 150 did not include entries related to the particular individual), a new local data storage element may be generated for the particular individual. If it is not possible to ascertain (beyond a threshold certainty) that the particular individual in question corresponds to a previously-known individual, a new local data storage element (e.g., an instance) may be created. For example, a first instance of a data storage element may be associated with a hypothesis that the new data element relates to a previously-unknown individual (i.e., a new individual) and a second instance of the data storage element may be associated with a hypothesis that the new data element relates to the previously-known individual. These hypotheses are mutually exclusive, i.e., both cannot be true, which means that creating the two instances causes a data conflict. Each instance may be assigned an uncertainty value indicating a probability that the instance is true. During subsequent evaluations and/or data gathering, the uncertainty values may be updated. At some point, an uncertainty associated with one of the hypotheses may satisfy a certainty criterion and the data conflict may be resolved by deleting the instance of the data storage element associated with the hypothesis that is not determined to be true. If available information suggests the particular individual may be one of several possible individuals, instances may be created for each of those possibilities (up to a threshold number of instances, with the most-likely matches being created first).

The functional modules of the intelligence analysis system 100 may include an object assessment module 114. The object assessment module 114 may perform initial processing of new data elements that are related to an object or objects. The object assessment module 114 operates in a manner similar to the human assessment module 112 but with respect to objects. Examples of evaluations that may be performed with respect to a particular object include attempting to determine an identity of the particular object, attempting to generate explanations for why the object was at a particular location or with a particular person or group, attempting to interpret a relationship of the particular object to one or more other objects attempting to interpret an importance, purpose or utility of the particular object, and re-evaluating and/or updating profiles associated with the particular object. For example, the object assessment module 114 may access data sources, such as the local learned knowledge storage module 150, the external information interface module 152, or both, to acquire additional information about a particular object. The object assessment module 114 may also generate instances (e.g., data storage elements) related to the object when the identity or relationship of the object to known objects, persons or locations is not clear. Information gathered by or generated by the object assessment module 114 may be used to update the known information about the object by updating one or more of the data sources.

The functional modules of the intelligence analysis system 100 may include a location assessment module 110. The location assessment module 110 may perform initial processing of new data elements that are related to locations. The location assessment module 110 operates in a manner similar to the human assessment module 112 but with respect to locations (e.g., geographic sites). Examples of evaluations that may be performed with respect to a particular location include attempting to generate explanations for why an object, person or group of persons were at the particular location, attempting to interpret an importance, purpose or utility of the particular location, attempting to interpret a relationship of the particular location to one or more other locations, and re-evaluating and/or updating profiles associated with the particular location. For example, the location assessment module 110 may access data sources, such as the local learned knowledge storage module 150, the external information interface module 152, or both, to acquire additional information about a particular location. The location assessment module 110 may also generate instances (e.g., data storage elements) related to the location when the identity or relationship of the location to known locations is not clear. Information gathered by or generated by the location assessment module 110 may be used to update the known information about the location by updating one or more of the data sources.

Whether the new data element is related to a person, an object, a location, or a combination thereof, spatial and/or temporal aspects of the new data may be evaluated. Accordingly, the functional modules of the intelligence analysis system 100 may include a temporal analysis module 118, a spatial analysis module 120, or both. The functional modules of the intelligence analysis system 100 may also include an information aggregation module 116. The information aggregation module 116 may be operable to form an aggregate set of data using information from the location assessment module 110, the human assessment module 112, the object assessment module 114, other functional modules, or a combination thereof. The aggregate data set may be provided to the temporal analysis module 118, the spatial analysis module 120, or both The aggregate data set may include new data (e.g., the new data element), known information (e.g., data retrieved via the learned knowledge storage module 150, the external information interface module 152, or both), evaluation results (e.g., one or more instances generated by or updated by the location assessment module 110, the human assessment module 112, and/or the object assessment module 114), results of other evaluations (e.g., conclusions of hypothesis evaluation, as described further below), or a combination thereof. In a particular embodiment, formation of the aggregate data set facilitates using a complete and current data set for subsequent evaluations. For example, the aggregate data set may be formed after each of the location assessment module 110, the human assessment module 112, and the object assessment module 114 has completed processing of the new data element.

Aggregation performed by the information aggregation module 116 may include organizing and correlating all available information that describes a person, location, object, or a combination thereof. For example, the aggregate data set may provide a best estimate of an identity of the person, the object, the location, or the combination thereof. Thus, as much data as is known about the person, the object, the location, or the combination thereof, will be correlated. If, at the end of an initial aggregation process, there is still uncertainty over an exact identity, then multiple instances (as described above for individuals) will be carried forward for additional processing. Carrying forward the multiple instances helps to ensure that no reasonable possibilities are overlooked or omitted from consideration. In addition, the existence of multiple possible identities (i.e., multiple instances) may cause a gap analysis and tasking module 130, described in more detail below, to task additional data sources and tools to provide information aimed at reducing the uncertainty and allowing determination of a single, high probability identity for the individual, the object, or the location. As processing proceeds and additional data is received, the multiple instances may be frequently re-evaluated and reduced whenever possible.

The aggregate data set may be provided from the information aggregation module 116 to the temporal analysis module 118 and to the spatial analysis module 120. Temporal evaluation results from the temporal analysis module 118 and spatial evaluation results from the spatial analysis module 120 are aggregated by the information aggregation module 116 when the results become available.

Temporal evaluation may include, for example, examining a time sequence of events, identifying patterns, identifying anomalies (e.g., deviations from societal or individual norms, deviations from general expectations, deviations from previously identified patterns), or a combination thereof. The temporal analysis module 118 may be operable to examine time based knowledge that is available to the intelligence analyzer 102, such as time-tagged records related to an individual, object or location. The temporal analysis module 118 may attempt to determine whether the time based knowledge indicates anything of interest. Examples of temporal information that may be discerned based on time based knowledge include an increased frequency of visits to a location (in general or by a particular individual or group of individuals). Another example may include recognizing that an individual (or group of individuals) has developed a temporal pattern or is deviating from a known temporal pattern. Examples of anomalies that may be identified as a deviation from a general expectation may include a ship departing at an unusual time based on tidal information, a shipping manifest indicating produce being shipped out of season, etc. The temporal analysis module 118 may also initiate generation of hypotheses by a hypothesis generation and evaluation module 140 of the intelligence analyzer 102. For example, the temporal analysis module 118 may initiate generation of hypotheses to explain a meaning of a temporal pattern, a meaning of a deviation from the temporal pattern, or a meaning of another temporal data anomaly.

Spatial evaluation may include, for example, examining spatial relationships among data, identifying patterns, and identifying anomalies (e.g., deviations from societal or individual norms, deviations from general expectations, or deviations from previously identified patterns). The spatial analysis module 120 may be operable to examine spatial knowledge that is available to the intelligence analyzer 102, such as location-tagged records related to individuals or objects. The spatial analysis module 120 may attempt to determine whether the spatial knowledge indicates anything of interest. Examples of spatial information that may be discerned based on spatial knowledge include co-location of multiple individuals or objects of interest. To illustrate, spatial analysis may determine that components required to assemble a particular weapon system are all located within a given region. As another illustrative example, the spatial analysis may indicate that two people frequent the same location at different times. Although the two people may not have a known relationship, the fact that they frequent the same location at different times may indicate existence of a covert relationship or a covert communications channel.

Another example may include recognizing that an individual (or group of individuals) has developed a spatial pattern or is deviating from a known spatial pattern. To illustrate, an individual may regularly take a particular path from point A to point B, which may be identified as a spatial pattern. When the individual takes a different path from point A to point B, the different path indicates a deviation from a known pattern. In another example, the spatial analysis module 120 may determine whether a spatial choice is reasonable (e.g., in view of societal norms or other expectations). For example, the spatial analysis module 120 may determine whether a route that is traveled is physically reasonably (e.g., not circuitous), and/or is consistent with predominant traffic patterns. A route that deviates significantly from norms may be flagged as a spatial data anomaly. As another example, the spatial analysis module 120 may identify patterns of locations visited, such as when two or more individuals are each known to have been present at several of the same locations (at the same time or at different times). As another example, the spatial analysis module 120 may identify patterns of placement of or location of objects, such as an unexpected or interesting pattern or distribution of the objects. The spatial analysis module 120 may also initiate generation of hypotheses by the hypothesis generation and evaluation module 140. For example, the spatial analysis module 120 may initiate generation of hypotheses to explain a meaning of a spatial pattern, a meaning of a deviation from the spatial pattern, or a meaning of another spatial data anomaly.

The functional modules of the intelligence analysis system 100 may include a group discovery module 122. The group discovery module 122 may be operable to recognizing groups of individuals, even when members of a group are attempting to be covert (e.g., to disguise their relationship as a group). A group may include inter-related individuals (e.g., siblings, spouse, or individuals with other legal, societal or blood relationships), individuals with a common purpose, individuals with common activities, individuals with shared contacts, individuals with temporal correlations, individuals with spatial correlations, or a combination thereof.

In a particular embodiment, after new data related to an individual has been evaluated, including temporal and spatial analysis, the group discovery module 122 may attempt to determine whether the new data and evaluation results have exposed any previously unknown connections to a group. The new data and evaluation results may also, or in the alternative, cause the group discovery module 122 to identify a previously unknown group. To illustrate, the group discovery module 122 may correlate all available information that is specific to an individual with information regarding other individuals, groups and activities to determine whether the individual is potentially part of a larger activity of interest. In some circumstances, analysis of a single individual may reveal some oddities but these oddities may not rise to a level that merits further analysis. Group discovery can trigger further analysis of a single individual when, in the context of a group, the oddities associated with the individual are considered in light of oddities related to other members of the group. For example, a pattern that is not apparent when the individual is considered alone may be apparent when the group is considered as a whole.

In a particular embodiment, any information received by the intelligence analyzer 102, whether the information is specifically generated as a result of non-group processing or group discovery processing may cause an update to group data, and may be processed by a group assessment module

124. The group assessment module 124 aggregates and updates knowledge regarding groups, which may be stored as data elements in the learned knowledge storage module 150. The group assessment module 124 may also initiate storage of information (e.g., data records) identifying a new group. The group assessment module 124 may initiate new hypotheses evaluations triggered by the new information and update ongoing hypothesis evaluations to assess behaviors and actions, interpret intent, and re-evaluate and update group profiles. The group assessment module 124 may initiate processing by a group temporal analysis module 126 and a group spatial analysis module 128, or both.

In a particular embodiment, the group temporal analysis module 126 operates in the same manner as the temporal analysis module 118, except that the group temporal analysis module 126 processes information about a group rather than information regarding an individual. Thus, for example, the group temporal analysis module 126 may identify a temporal pattern that is not discernible for a single individual but is related to a group as a whole. To illustrate, a single individual may dine out occasionally, with no discernible pattern of interest. However, analysis of the group as a whole may indicate that two or more members of the group dine out at a particular location each Thursday night, which may be a pattern that provides useful information to predict locations of members of the group at a particular date and time.

In a particular embodiment, the group spatial analysis module 128 operates in the same manner as the spatial analysis module 120, except that the group spatial analysis module 128 processes information about a group rather than information regarding an individual. Thus, for example, the group spatial analysis module 128 may identify a spatial pattern that is not discernible for a single individual but is related to a group as a whole. To illustrate, a single individual may dwell in a particular residence that provides no useful pattern information. However, analysis of the group as a whole may indicate that two or more members of the group reside in adjacent residences, which may be a pattern that provides useful information regarding members of the group and help identify other potential group members.

The group assessment module 124 may aggregate group analysis results from the group temporal analysis module 126 and the group spatial analysis module 128. The group assessment module 124 may also initiate generation of hypotheses by the hypothesis generation and evaluation module 140. For example, the group assessment module 124 may initiate generation of hypotheses to explain a meaning of a temporal or spatial pattern of a group, a meaning of a deviation from the temporal or spatial pattern of the group, or a meaning of another data anomaly related to the group.

The hypothesis generation and evaluation module 140 may be used by other modules of the intelligence analyzer 102 as a common means to generate hypotheses regarding implications of new data elements that are evaluated and/or evaluation results. The hypothesis generation and evaluation module 140 instantiates hypotheses based on templates (described further below). The hypothesis generation and evaluation module 140 may assign, calculate or estimate a probability of correctness of each hypothesis and a confidence interval (or confidence interval) for each hypothesis. The probability of correctness and confidence interval for each hypothesis may be presented to a user via a user communication module 106 so that the user is apprised of analysis results and situations as they are developing. The user communication module 106 may also provide the user with access to information that supports the analysis result or hypothesis and open questions that are still being evaluated.

The functional modules of the intelligence analysis system 100 may include a gap analysis and tasking module 130. The gap analysis and tasking module 130 may be operable to identify missing information (i.e., information that would be useful to further evaluation of a particular hypothesis) and to task data gathering resources with locating the missing information. For example, the gap analysis and tasking module 130 may determine how to fill an identified data gap and may then task resources to fill the gap. In a particular embodiment, a data gap may be identified based on a template that is used for evaluation of a hypothesis. In this embodiment, the hypothesis templates may include data fields related to information that may be used to confirm or deny correctness of the hypothesis. When a hypothesis is instantiated, available data may be used to fill the data fields to an extent possible. Data fields that cannot be reliably filled are data gaps. Identification of data gaps is described further below. Examples of an identified data gap may include data attributes within a data structure of information (e.g., a hypothesis instance) that are not associated with data (e.g., empty data fields). In another example, a data gap may include information that is desirable to perform a more complete evaluation of one or more hypotheses. The gap analysis and tasking module 130 may include or have access to specialized evaluation tools, data mining tools, or a system user (e.g., to pose questions to the user). The gap analysis and tasking module 130 may also generate general tasking (e.g., standing queries) related to individuals, groups, locations and/or objects of interest, in order to ensure that relevant data that could impact a current analysis is considered (even when the relevant data is not explicitly needed to fill an identified gap).

In a particular embodiment, the gap analysis and tasking module 130 may also implement other types of analyses. For example, the gap analysis and tasking module 130 may implement a procedure to determine whether a received report or set of data records are self-consistent or consistent with other known facts. To illustrate, a security report may describe a person, the person's background, the person's known associates, etc. Such reports may follow guidelines that specify particular content that should be included in the report. This content may be correlated with or compared to other existing data to check for consistency. Since some data sources may have missing or bad data contents, the gap analysis and tasking module 130 may attempt to assemble as complete and reliable a data set as possible from multiple data sources or using multiple approaches. To illustrate, the gap analysis and tasking module 130 may task a search for "Entity XYZ" in a licensing database using a main database index key (e.g., a person name or registration number). If the search fails to return expected data, the gap analysis and tasking module 130 may cause the search to be repeated using other fields (e.g., searching for all people licensed during a particular timeframe, then looking at returned records for people that nearly match the individual for which data is being gathered).

In a particular embodiment, functionality of one or more of the modules 110, 112, 114, 116, 118, 120, 122, 124, 126, 128, 130, 140 is implemented based on templates. A template of a particular module may describe tasks and analysis to be performed to accomplish goals of the particular module. In an illustrative embodiment, the templates are created based on inputs from multiple subject matter experts. For example, each of the subject matter experts may be tasked with outlining steps and analysis to be performed to accomplish a specific goal, wherein the goal corresponds to a goal of the particular module. Combined knowledge from multiple subject-matter experts may be used to enable the intelligence analyzer 102 to outperform any single expert. Further, the intelligence analyzer 102 is able to maintain and process multiple parallel complementary or conflicting reasoning streams that represent viewpoints of different experts which disagree on a proper method or weighting of analysis. Thus, the intelligence analyzer 102 enables presentation of results of multiple different analysis methods, similar to the way a team of analysts might present alternate interpretations of a situation or set of data. The templates may be automatically instantiated by the modules of the intelligence analyzer 102 and executed based on the information available and analysis flow of the templates. The templates may include instructions that are executable to generate probabilities and confidence estimates for hypotheses and to recognize trends, patterns, and anomalies. Tasking templates may include descriptions of tasks to be performed to support evaluations and to fill knowledge gaps and instructions that are executable to initiate the tasks.

Figure 2:
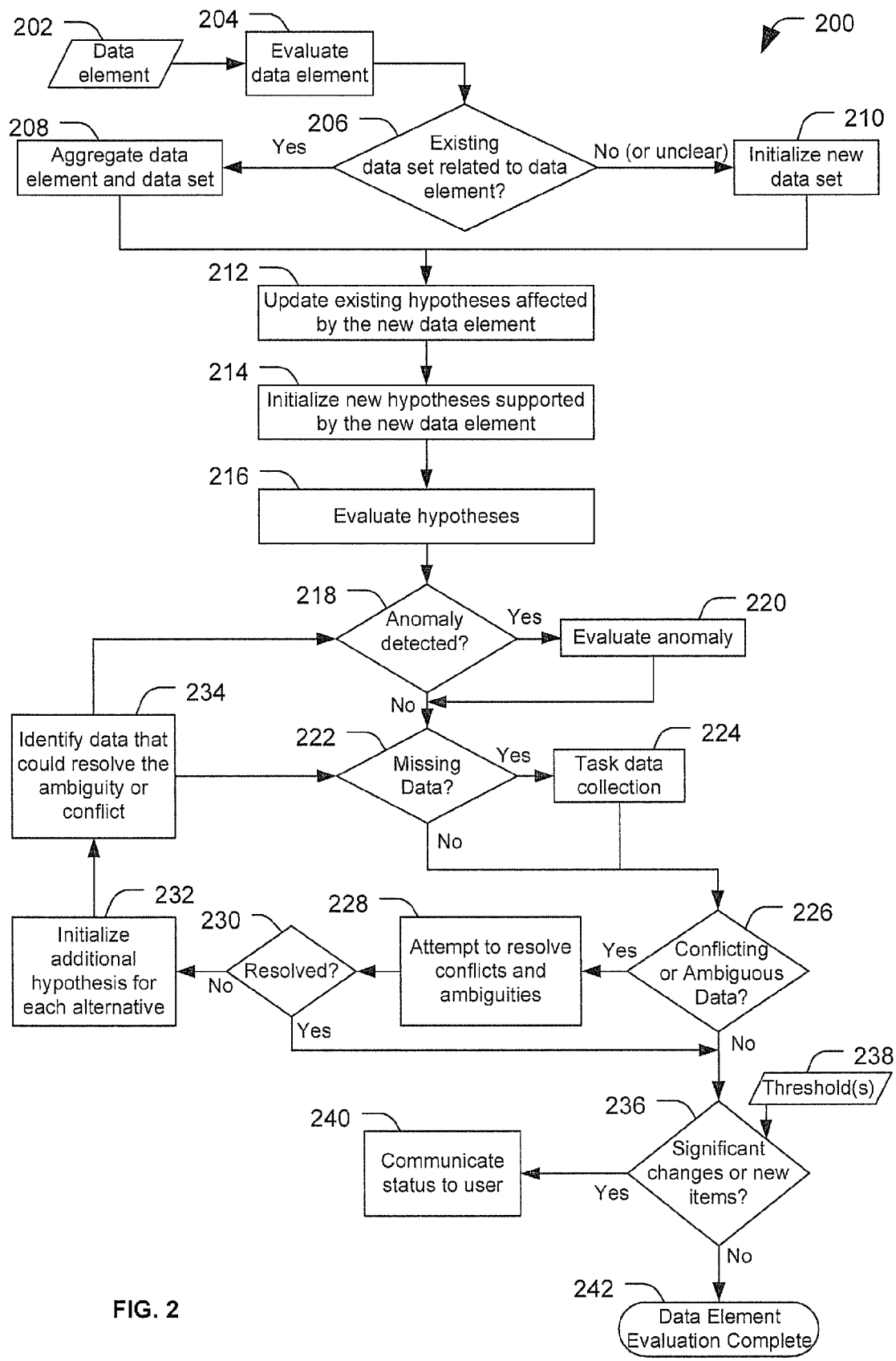
FIG. 2 is a flow chart of a first particular embodiment of a method of intelligence analysis.

FIG. 2 is a flow chart of a first particular embodiment of a method 200 of intelligence analysis. The method 200 may be performed by the intelligence analysis system 100. As explained above, the intelligence analysis system 100 may operate in a non-linear manner, where evaluation of multiple hypotheses and other tasks are performed in parallel. To illustrate, a single data element may stimulate instantiation of multiple templates to identify an individual, object or location to which the data element pertains. Further, evaluation of the data element may cause instantiation of multiple hypotheses, such as hypotheses related to temporal or spatial patterns, hypotheses related to groups, etc. Evaluation of the data may identify data gaps, anomalies or conflicts, resulting in data gathering tasks. These processes may be performed in parallel and iteratively. To illustrate, when a first new data element is received and a hypothesis is generated (e.g., instantiated using a template) based on the first new data element, the hypothesis may include data gaps that lead to further data gathering tasks. One or more of the data gathering tasks may result in a second new data element being received. The second new data element may be used in the analysis of the first new data element and may also be treated as an independent new data element (e.g., may be subject to the processing that the first new data element was subjected to before the second data element was received). Accordingly, the second new data element may stimulate new data acquisition tasks that may themselves cause additional new data elements to be received. Accordingly, to simplify the description of the method 200, FIG. 2 is illustrates processing only a single data element and does not show each branch or loop back that may be present during execution of the intelligence analysis system 100.

The method 200 includes, at 204, evaluating a received data element 202. A determination is performed, at 206, whether the received data element 202 is related to an existing data set. When the received data element 202 is determined to be related to an existing data set, the received data element 202 may be aggregated with the existing data set, at 208. When the received data element 202 is determined not to be related to an existing data set (and when it is unclear whether the received data element is related to an existing data set), a new data set may be initialized, at 208, and the received data element 202 may be included in the new data set.

At 212, existing hypotheses that are affected by the received data element 202 may be updated. For example, the received data element 202 may be inserted into a field of an existing hypothesis. Additionally or in the alternative, at 214, one or more new hypotheses related to the received data element 202 may be initialized. For example, the hypothesis generation and evaluation module 140 of FIG. 1 may insert data from the received data element 202 into a data field of a hypothesis template (either a new instance of the hypothesis template or an existing instance of the hypothesis template). After the received data element 202 is inserted into one or more hypotheses, the hypotheses may be evaluated, at 216. Evaluation of the hypotheses may include updating likelihood and/or confidence intervals associated with the hypotheses. Evaluation of the hypotheses may also include dropping one or more hypotheses with low likelihood or unfavorable confidence intervals.

The method 200 also includes, at 218, determining whether an anomaly is detected. When an anomaly is detected, the anomaly may be evaluated, at 220. Evaluating the anomaly may include, for example, generating and evaluating one or more new hypotheses to attempt to identify an explanation for the anomaly. In another example, evaluating the anomaly may include determining whether additional data can be identified to clarify the anomaly. An anomaly may exist, for example, when new information (e.g., from the received data element 202) conflicts with information contained within an existing hypothesis. To illustrate, in the existing hypothesis, a particular person may be associated with a first passport number; however, in the received data element, the particular person may be associated with a second passport number. Thus, there is an anomaly regarding the passport numbers and/or the identity of the person. In another example, an anomaly may exist when implications of a hypothesis are inconsistent with accepted trends, norms or behaviors. To illustrate, an anomaly may be present when a truck manifest lists fresh cherries leaving Washington State in January, because January is not cherry season in Washington State. In another example, an anomaly may exist when actions or behaviors are inconsistent with statistical analysis of prior behavior. The prior behavior may relate to temporal, spatial or group characteristics. To illustrate, Group A, including persons X, Y, and Z, may be known to travel together to a work location and to arrive at 8 a.m. An anomaly may exist when, on a particular day, the persons X, Y and Z arrive at the work location together at 7:30 a.m., when persons X and Y arrive at 8 a.m. without person Z, or when persons X, Y, and Z are seen at a location other than the work location.

If no anomaly is detected or after evaluation of the anomaly, the method 200 may include, at 222, determining whether particular data is missing. When missing data is identified, the method 200 may include, at 224, tasking data collection. For example, one or more data collection assets may be tasked to find the missing data.

The method 200 may also include, at 226, determining whether conflicting or ambiguous data is present in one or more instantiated templates. Several types of conflicts or ambiguities may exist in certain circumstances. When conflicting or ambiguous data is present, the method 200 may include, at 228, attempting to resolve the conflict or ambiguity based on available data. When the conflict or ambiguity cannot be resolved, at 230, using the available data, the method 200 may include, at 232, initializing additional hypotheses for each alternative of the conflicting or ambiguous data. For example, when a first data element indicates that a person has a first identity and a second data element indicates that the person has a second identity, a first hypothesis may be generated in which the person has the first identity and a second hypothesis may be generated in which the person has the second identity. Further, depending on the specific circumstance, a third hypothesis may be generated in which the person has both the first identity and the second identity (i.e., both identities are aliases of the person). Additionally or in the alternative, a fourth hypothesis may be generated in which the person has neither the first identity nor the second identity (i.e., both identities are cases of mistaken identities). The method 200 may also include, at 234, identifying data that could resolve the conflict or ambiguity. The method may continue, at 218, by determining whether an anomaly exists, and/or, at 222, by determining whether missing data has been identified.

When no conflicting or ambiguous data is present, at 226, or when conflicting or ambiguous data has been resolved, at 230, the method 200 may include determining whether there has been a significant change or a new item, at 236. In a particular embodiment, the determination of whether there has been a significant change or new item may be made based on one or more thresholds 238 or other notification criteria. For example, the notification criteria may indicate that a significant change occurs when a hypothesis is dropped, when a hypothesis is determined to have a likelihood value that satisfies a threshold 238, when a new hypothesis is instantiated, etc. When there has been a significant change or new item, the method 200 may include, at 240, communicating status information to a user. For example, the user may be notified of the significant change or new item. When there has not been a significant change or new item, the method 200 may end, at 242.

Thus, the method 200 illustrates receiving, aggregating, and processing a new data element 202. The method 200 illustrates processing controlled by functional modules of an intelligence analyzer, such as the location assessment module 110, the human assessment module 112, the object assessment module 114, the group assessment module 124, or one or more of the other modules of the intelligence analysis system 100 of FIG. 1. The method 200 also illustrates operation of the hypothesis generation and evaluation module 140, the gap analysis and tasking module 130, and the user communication module 106 in conjunction with the processing of other function modules.

Figure 3:
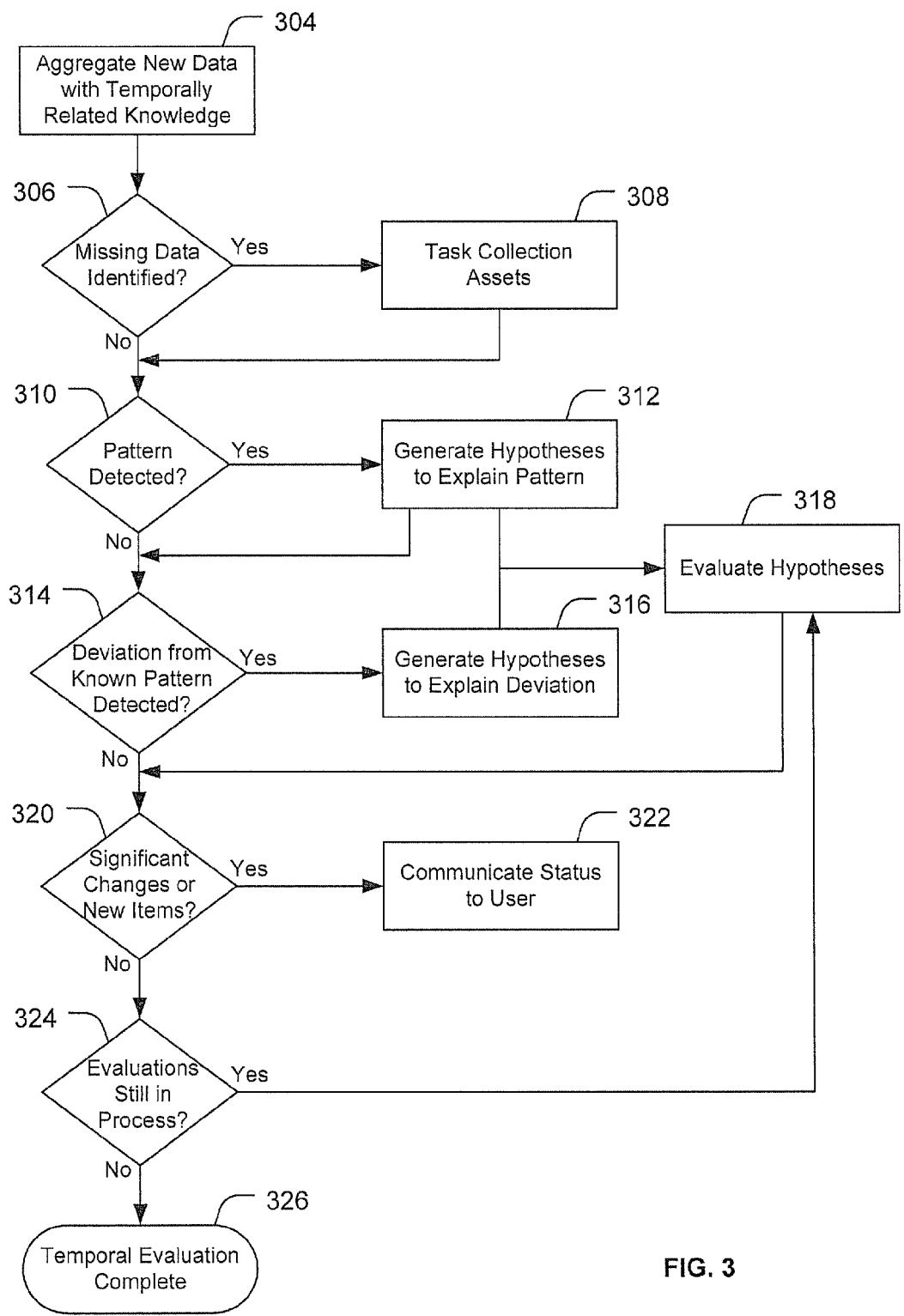
FIG. 3 is a flow chart of a second particular embodiment of a method of intelligence analysis illustrating aspects of temporal analysis.

FIG. 3 is a flow chart of a second particular embodiment of a method 300 of intelligence analysis illustrating aspects of temporal analysis. The method 300 may be performed by the temporal analysis module 118 of FIG. 1, the group temporal analysis module 126, or both, in conjunction with other modules of the intelligence analysis system 100. As explained above, modules of the intelligence analysis system 100 may operate in a non-linear manner, where evaluation of multiple hypotheses and other tasks are performed in parallel. Accordingly, to simplify the description of the method 300, FIG. 3 illustrates processing of temporal aspects of a single data element and does not show each branch or loop back that may be present during execution of the intelligence analysis system 100.

The method 300 includes, at 304, aggregating new data with previously known, temporally related data (e.g., other time-tagged records). The method 300 may include, at 306, determining whether missing data has been identified. For example, one or more templates may be used to evaluate the temporally related data. In this example, when a template has a data field that does not include data, data associated with the data field may be identified as missing data. When missing data is identified, the method 300 may include, at 308, tasking data collection assets. For example, one or more data collection assets may be tasked to find the missing data.

When no missing data is identified, or after the data collection assets have been tasked, the method 300 may include, at 310, determining whether a pattern is detected in the aggregated temporally related data. When a pattern is detected, the method 300 may include, at 312, generating one or more hypotheses to explain the pattern. For example, one or more hypothesis templates may be instantiated. Particular hypothesis templates that are instantiated may be selected based on content of the aggregated temporally related data, based on the detected pattern, based on other factors, or a combination thereof. To illustrate, when the pattern relates to an individual going to a particular location at a particular time each day, a hypothesis template related to reasons that a person would go to the particular location daily may be instantiated. The hypothesis template may include explanations such as, the person is employed at the particular location, the person lives at the particular location, the person has a relative or acquaintance at the particular location, and so forth. The hypothesis template may also include data fields corresponding to data elements that support or refute each explanation. For example, a particular data field may relate to the time of day that the person arrives at the particular location, where a morning or midday arrival time may be more likely to be related to a work location (i.e., supporting an explanation that the person works at the particular location); whereas, an evening or night time of arrival at the particular location may be more likely to be related to a home location (i.e., supporting an explanation that the person lives at the particular location).

The method 300 may also include evaluating the one or more hypotheses, at 318. Evaluating the one or more hypotheses may include applying known data (e.g., the aggregated temporally related data and perhaps other data) to data fields of each instantiated hypothesis template and performing associated calculations and/or tasks. To illustrate, data fields of the instantiated hypothesis templates may be populated with the known data, and calculations (which may be embedded within each hypothesis template) may be performed, based on the populated data fields to determine a likelihood that each hypothesis is correct (and possibly associated confidence intervals). Evaluating the one or more hypotheses may also include eliminating hypotheses that are not supported by the known data. For example, a hypothesis that is associated with a low likelihood of being correct (e.g., a likelihood of correctness below a threshold) may be eliminated.

When no pattern is detected or after generating hypotheses to explain a detected pattern, the method 300 may include, at 314, determining whether a deviation from a known pattern is detected. When a deviation from a known pattern is detected, the method may include, at 316, generating one or more hypotheses to explain the deviation. The method 300 may also include evaluating the one or more hypotheses, at 318.

The method 300 includes, at 320, determining whether there are significant changes or new items. The determination of whether there has been a significant change or new item may be based on one or more thresholds or other notification criteria. When there are significant changes or new items, the method 300 may include, at 322, communicating status information to a user. The method 300 may also include, at 324, determining whether there are evaluations still in progress. When there are evaluations still in progress, the method 300 may continue evaluating hypotheses, at 318. When there are not evaluations still in progress, the method 300 ends and the temporal evaluation is complete, at 320.

Figure 4:
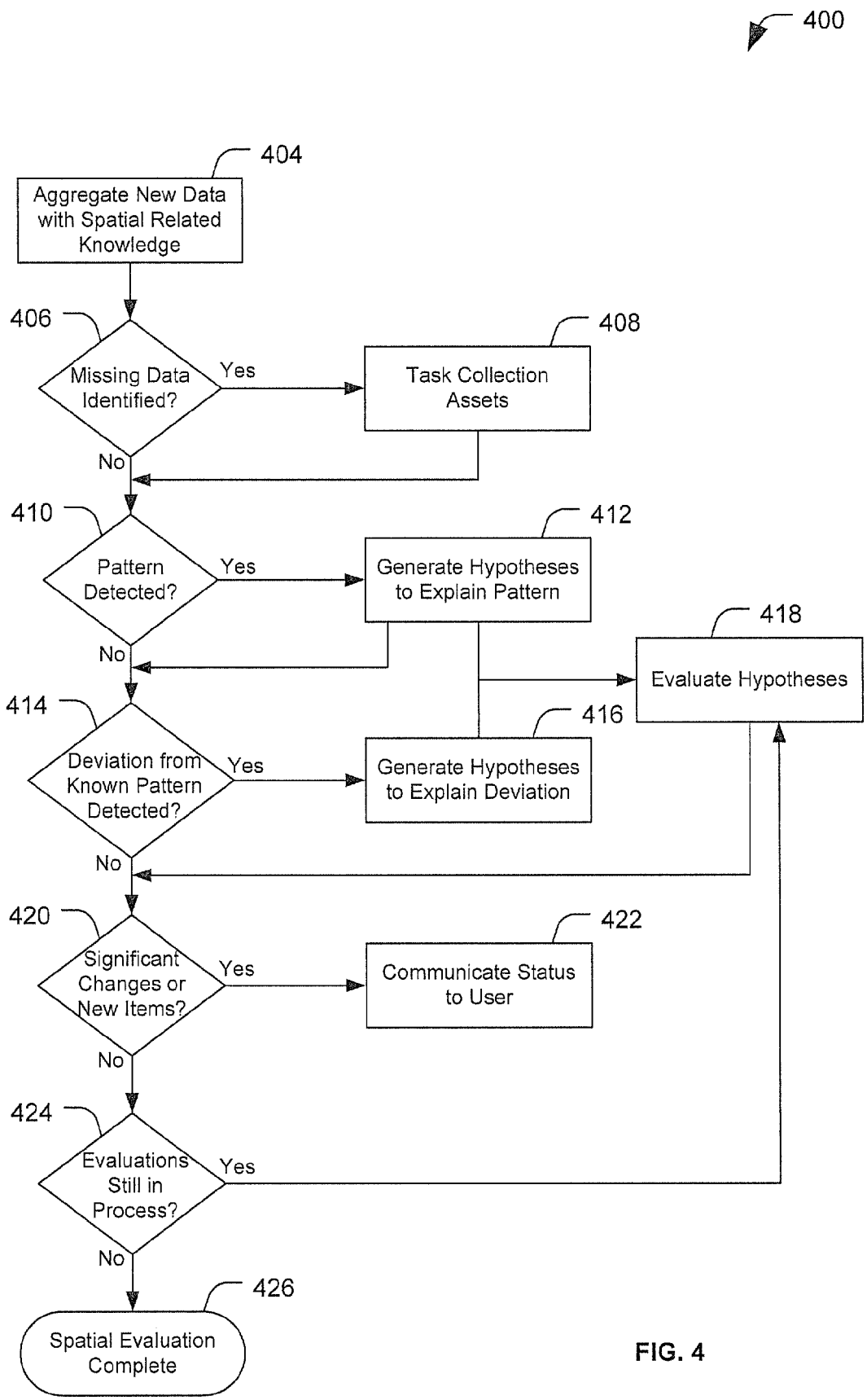
FIG. 4 is a flow chart of a third particular embodiment of a method of intelligence analysis illustrating aspects of spatial analysis.

FIG. 4 is a flow chart of a third particular embodiment of a method 400 of intelligence analysis illustrating aspects of spatial analysis. The method 400 may be performed by the spatial analysis module 120 of FIG. 1, the group spatial analysis module 128, or both, in conjunction with other modules of the intelligence analysis system 100. As explained above, modules of the intelligence analysis system 100 may operate in a non-linear manner, where evaluation of multiple hypotheses and other tasks are performed in parallel. Accordingly, to simplify the description of the method 400, FIG. 4 illustrates processing of spatial aspects of a single date element and does not show each branch or loop back that may be present during execution of the intelligence analysis system 100.

The method 400 includes, at 404, aggregating new data with previously known, spatially related data (e.g., other location-tagged records). The method 400 may include, at 406, determining whether missing data has been identified. For example, one or more templates may be used to evaluate the spatially related data. In this example, when a template has a data field that does not include data, data associated with the data field may be identified as missing data. When missing data is identified, the method 400 may include, at 408, tasking data collection assets. For example, one or more data collection assets may be tasked to find the missing data.

When no missing data is identified, or after the data collection assets have been tasked, the method 400 may include, at 410, determining whether a pattern is detected in the aggregated spatially related data. When a pattern is detected, the method 400 may include, at 412, generating one or more hypotheses to explain the pattern. For example, one or more hypothesis templates may be instantiated. As with the temporal evaluation described with reference to FIG. 3, particular hypothesis templates that are instantiated may be selected based on content of the aggregated spatially related data, based on the detected pattern, based on other factors, or a combination thereof.

The method 400 may also include evaluating the one or more hypotheses, at 418. Evaluating the one or more hypotheses may include applying known data (e.g., the aggregated spatially related data and perhaps other data) to data fields of each instantiated hypothesis template and performing associated calculations or other tasks. To illustrate, data fields of the instantiated hypothesis templates may be populated with the known data and calculations may be performed, based on the populated data fields, to determine a likelihood that each hypothesis is correct (and possibly associated confidence intervals). Evaluating the one or more hypotheses may also include eliminating hypotheses that are not supported by the known data. For example, a hypothesis that is associated with a low likelihood of being correct (e.g., below a threshold) may be eliminated.

When no pattern is detected or after generating hypotheses to explain a detected pattern, the method 400 may include, at 414, determining whether a deviation from a known pattern is detected. When a deviation from a known pattern is detected, the method may include, at 416, generating one or more hypotheses to explain the deviation. The method 400 may also include evaluating the one or more hypotheses, at 418.

The method 400 includes, at 420, determining whether there are significant changes or new items. The determination of whether there has been a significant change or new item may be based on one or more thresholds or other notification criteria. When there are significant changes or new items, the method 400 may include, at 422, communicating status information to a user. The method 400 may also include, at 424, determining whether there are evaluations still in progress. When there are evaluations still in progress, the method 400 may continue evaluating hypotheses, at 418. When there are not evaluations still in progress, the method 400 ends and the spatial evaluation is complete, at 420.

Figure 5:
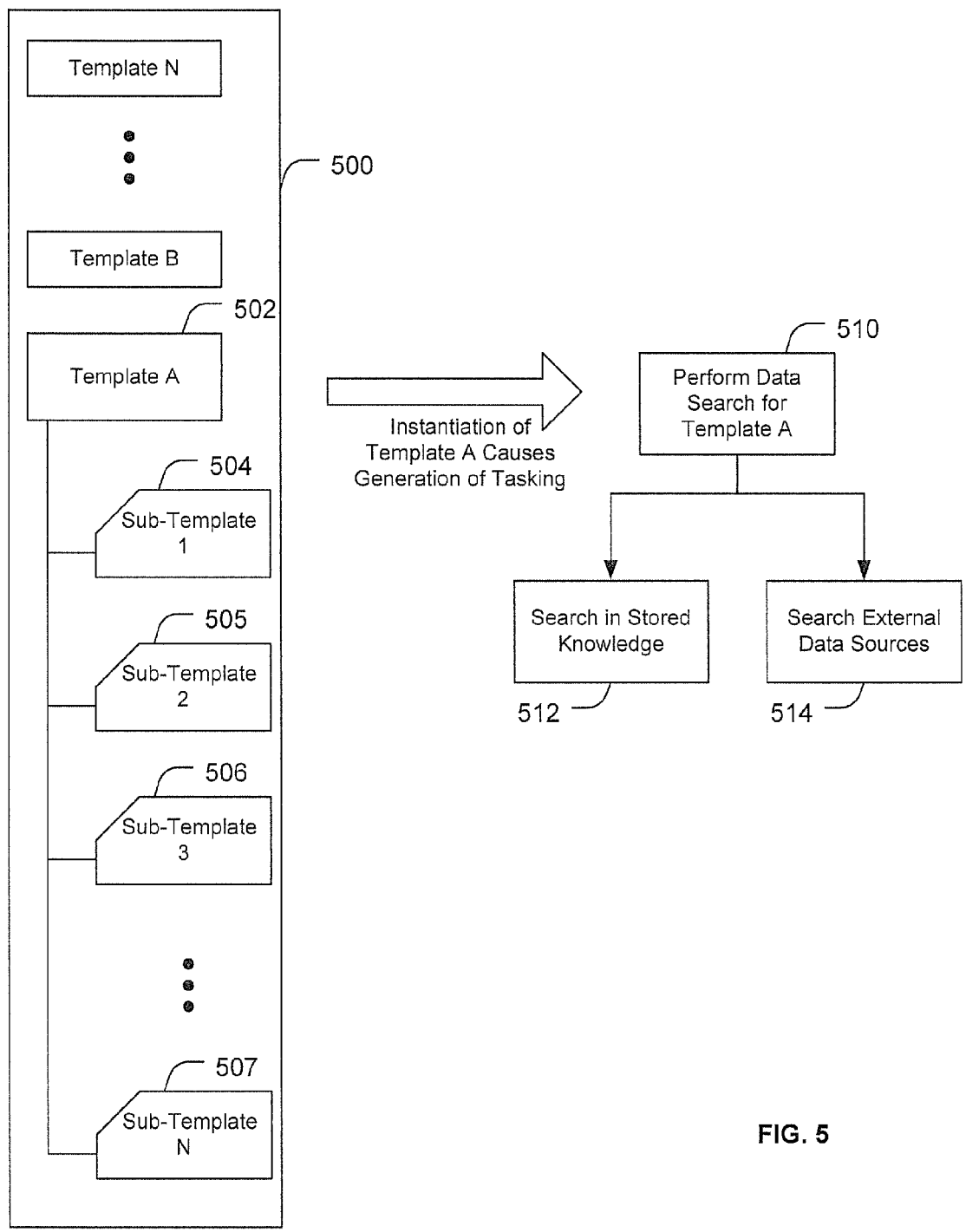
FIG. 5 is a diagram illustrating a first method of operation of the intelligence analysis system of FIG. 1 according to a particular embodiment.

FIG. 5 is a diagram illustrating a first method of operation of the intelligence analysis system of FIG. 1 according to a particular embodiment. In particular, FIG. 5 illustrates use of templates during intelligence analysis according to a particular embodiment.

In FIG. 5, a Template A 502 is selected for instantiation from a set of available templates 500. For example, the set of available templates 500 may include templates that are associated with assessment of a person (e.g., by the human assessment module 112 of FIG. 1), assessment of a location (e.g., by the location assessment module 110), assessment of an object (e.g., by the object assessment module 114), assessment of a temporal aspects of data (e.g., by the temporal analysis module 118), assessment of a spatial aspects of data (e.g., by the spatial analysis module 120), group discovery (e.g., by the group discovery module 122), assessment of a group (e.g., by the group assessment module 124), assessment of a temporal aspects of a group (e.g., by the group temporal analysis module 126), assessment of a spatial aspects of group (e.g., by the group spatial analysis module 128), generation or evaluation of a hypothesis (e.g., by hypothesis generation and evaluation module 140), or a combination thereof.

The Template A 502 may be selected from the set of available templates 500 based on a type of analysis, evaluation or assessment to be performed. For example, the Template A 502 may relate to temporal analysis and non-selected templates B and N may be related to spatial analysis. Accordingly, the Template A 502 may be selected when a temporal analysis is to be performed.

The Template A 502 may also, or in the alternative, be selected from the set of available templates 500 based on data that is available. For example, the Template A 502 includes a set of sub-templates, including a first sub-templates 504, a second sub-templates 505, a third sub-templates 506 and an Nth sub-templates 507. Each of the sub-templates 504-507 may include a single data field, a set of data fields, instructions to implement one or more tasks, or a combination thereof (e.g., one or more data fields and instructions associated with the data fields, such as instructions to calculate likelihood and/or confidence values). When a working set of data includes data related to one or more of the sub-templates 504-507, the Template A 502 may be instantiated.

The Template A 502 may also, or in the alternative, be selected in response to an outcome or analysis of another template. For example, the Template B may have been previously instantiated. Evaluation of the Template B may have concluded and the Template A 502 may have been selected for instantiation based on the conclusion of the evaluation of the Template B. For example, an instruction embedded within Template B may instruct that Template A 502 be instantiated at the conclusion of the evaluation of Template B or based on the result of the evaluation of Template B.

After the Template A 502 is selected, an instance of the Template A 502 may be generated. The instance of the Template A 502 is a working copy of the Template A 502 where data fields of the sub-templates 504-507 are populated with available data. For example, when the Template A 502 is instantiated, a data search may be performed, at 510, to gather data to populate the data fields of the sub-templates 504-507. The data search may include searching, at 512, an internal stored knowledge base (e.g., via the learned knowledge storage module 150 of FIG. 1), searching, at 514, an external data source (e.g., via the external information interface module 152 of FIG. 1), or both.

As an example, a new data element may be received that is a new certification for a particular person. In order to process the new data element, the Template A 502 may be instantiated (e.g., by the human assessment module 112 of FIG. 1). In response to the instantiation of the Template A 502 with the new data element, the gap analysis and tasking module 130 may create tasks to search the learned knowledge storage module 150 for any information that is already known about the particular person. The gap analysis and tasking module 130 may also create tasks to search the external information interface module 152 to seek out additional information about the particular person. The gap analysis and tasking module 130 may use the data fields of the sub-templates 504-507 as a guide for what data is needed and is to be searched for. For example, the gap analysis and tasking module 130 may generate tasks to find data to populate empty data fields of the sub-templates 504-507. When the data fields of the sub-templates 504-507 have been populated, processing associated with the sub-templates 504-507 may be performed to conclude an evaluation associated with the Template A 502.

Figure 6:
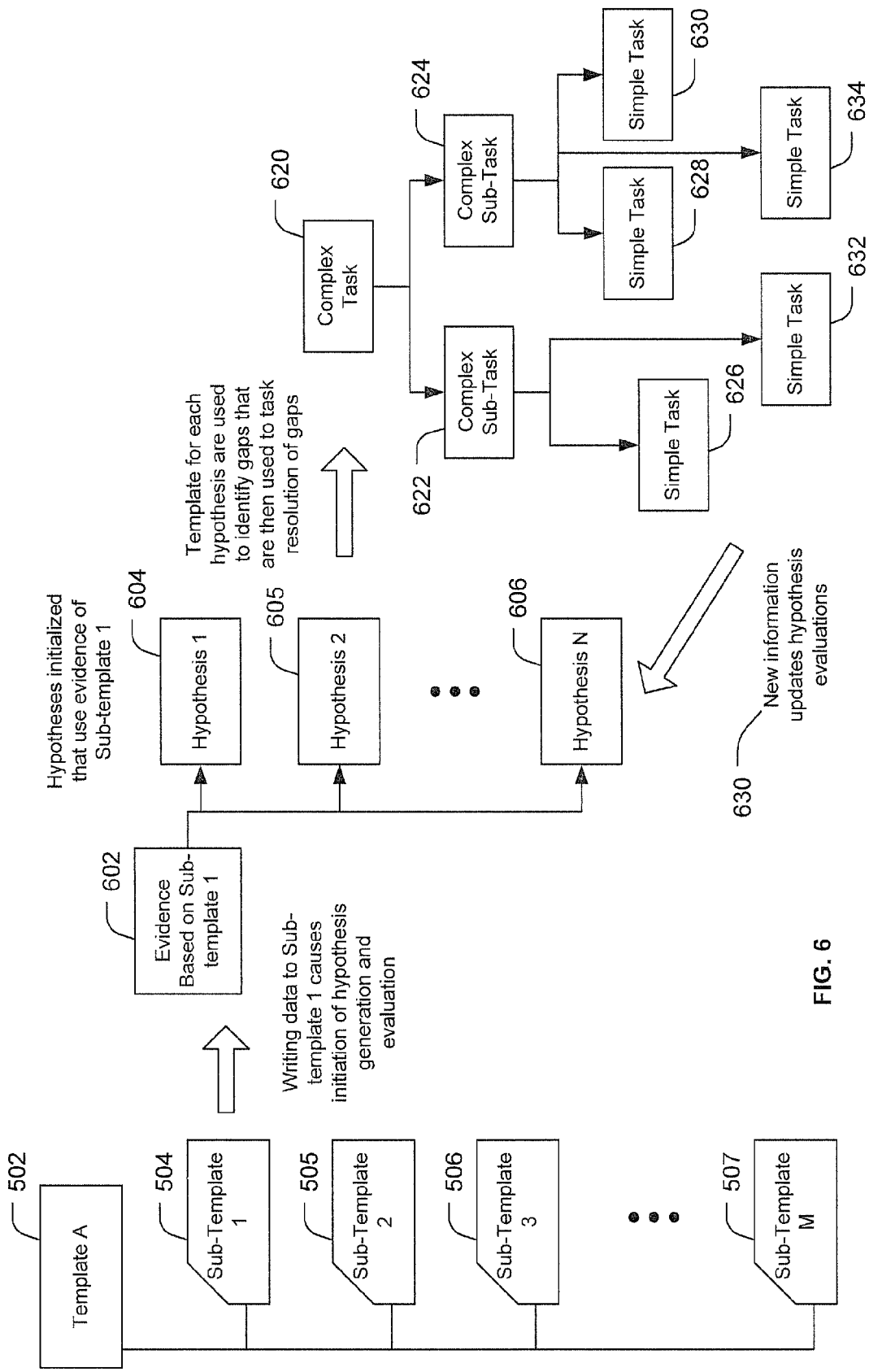
FIG. 6 is a diagram illustrating a second method of operation of the intelligence analysis system of FIG. 1 according to a particular embodiment.

FIG. 6 is a diagram illustrating a second method of operation of the intelligence analysis system of FIG. 1 according to a particular embodiment. In particular, FIG. 6 illustrates hypothesis generation and tasking associated with instantiation of the Template A 502.

In FIG. 6, the Template A 502 is instantiated and available data is used to populate data fields of the sub-templates 504-507. In the embodiment illustrated in FIG. 6, the first sub-template 504 includes instructions (e.g., code) that cause initiation of hypothesis generation and evaluation in response to data populating one or more data fields of the first sub-template 504. For example, one or more hypothesis, such as a first hypothesis 604, a second hypothesis 605, and an Nth hypothesis 606, may be initialized. The hypotheses 604-606 may be initialized based on evidence (e.g., data of the data fields, processing results, or both) associated with the first sub-template 504. To illustrate, the hypotheses 604-606 may correspond to alternate explanations that explain the data of the data fields, the processing results, or both.

Continuing the example described with reference to FIG. 5 related to a new certification for a particular person, when the human assessment module 112 of FIG. 1 writes the certificate information to the Template A 502, the hypothesis generation and evaluation module 140 may instantiate hypotheses that use a certificate number as a piece of evidence that applies to a particular hypothesis (e.g., instantiate hypotheses templates that have a data field related to a certificate number). To illustrate, the instantiated hypotheses 604-606 may correspond, respectively, to explanations that the certificate is valid, that the certificate is fraudulent, and that the certificate number is associated with a non-fraudulent error.

After the hypotheses 604-606 are initialized gap analysis may be performed to determine what additional data may be helpful to evaluate the hypotheses 604-606. For example, the gap analysis and tasking module 130 of FIG. 1 may identify information gaps to be filled based on differences between the entire template for each hypothesis and the portions that are currently instantiated (i.e., populated with data). The gap analysis and tasking module 130 may generate tasks to fill the information gaps. The tasks may vary in complexity. To illustrate, in the embodiment of FIG. 6, a complex task 620 has been generated. The complex task 620 may include a number of complex sub-tasks 622 and 624. In this context, complex refers to a task that includes more than one action. For example, as shown in FIG. 6, each of the complex sub-tasks 622 and 624 includes multiple simple tasks 626, 628, 630, 632, and 634. For example, a simple task may include a database query which generates a single result or a set of results. The complex sub-tasks 622 and 624 may direct the simple tasks (e.g., specify data sources and/or queries for each simple task). The complex sub-tasks 622 and 624 may also, or in the alternative, process results received from the simple tasks 626, 628, 630, 632, and 634. For example, a first complex sub-task 622 may aggregate, filter or otherwise process results received from its associated simple tasks 626 and 632. The complex task 620 may direct the complex sub-tasks 622 and 624 (e.g., specify data sources and/or queries for each complex sub-tasks 622 and 624). For example, the first complex sub-task 622 may be directed to query local data sources, via the learned knowledge storage module 150 of FIG. 1, and the second complex sub-task 624 may be directed to query external data sources, via the external information interface module 152 of FIG. 1. The complex task 620 may also, or in the alternative, process results received from the complex sub-tasks 622 and 624. For example, the complex task 620 may aggregate, filter or otherwise process results received from the complex sub-tasks 622 and 624. To illustrate, the complex task 620 or one of the complex sub-tasks 622 and 624 may parse results from the simple tasks 626, 628, 630, 632, and 634 to associate the results with specific data fields of the hypotheses 604-606.

Continuing the example of the certificate number associated with the particular person, the gap analysis and tasking module 130 of FIG. 1 may generate the complex task 620, the complex sub-tasks 622 and 624, and the simple tasks 626, 628, 630, 632, and 634 to acquire information to validate the certificate number for the particular person or to check in general for this type of certification for the particular person. As new information 640 related to the certificate arrives based on the generated tasks, the new information 640 may be used to update the hypotheses 604-606, to update sub-templates 504-507 of the Template A 502, to update other hypotheses or templates that are currently instantiated for other evaluations, or a combination thereof. Whenever the hypotheses 604-606 are updated, the hypothesis generation and evaluation module 140 may execute embedded evaluation processing (e.g., instructions to estimate probability that a particular hypothesis is correct). In this example, the hypothesis generation and evaluation module 140 may execute embedded evaluation processing to confirm or deny a match for the certificate number, to resolve ambiguities (such as a simple typographical error in the original provided certificate number), to prune out hypotheses 604-606 that are unlikely (e.g., have a probability of being correct that is less than a threshold), or a combination thereof. In a particular embodiment, the hypothesis generation and evaluation module 140 also generates probabilities of correctness and confidence intervals for hypotheses that are not pruned (e.g., eliminated).

Figure 7:
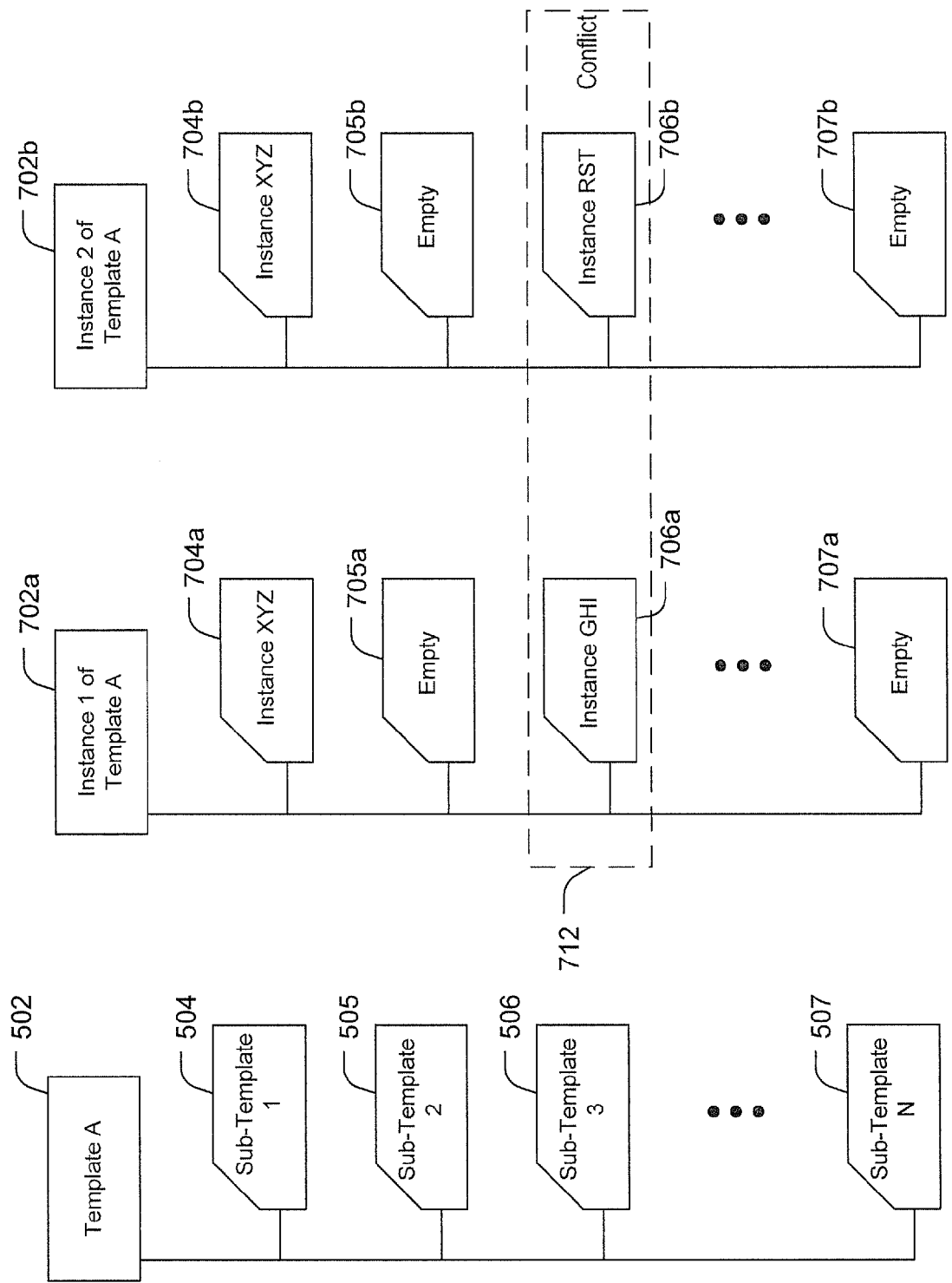
FIG. 7 is a diagram illustrating a third method of operation of the intelligence analysis system of FIG. 1 according to a particular embodiment.

FIG. 7 is a diagram illustrating a third method of operation of the intelligence analysis system 100 of FIG. 1 according to a particular embodiment. In particular, FIG. 7 illustrates identification of missing data and conflicting or ambiguous data according to a particular embodiment. In FIG. 7, two instances of the Template A 502 have been generated, including a first instance 702a and a second instance 702b. The instances 702a and 702b may be used to evaluate conflicting data, such as conflicting data 712 associated with the third sub-template 506. That is, when conflicting or ambiguous data exits, different instance of one or more templates may be generated to evaluate the conflicting or ambiguous data.

As a specific example, in a particular circumstance, data that causes the Template A 502 to be selected to be instantiated as the first instance 702a of the Template A 502 may include data associated with the first sub-template 504. For example, data represented in FIG. 7 as having a value "XYZ" may be used to populate the first sub-template 704a of the first instance 702a. As processing continues, other data associated with the Template A 502 may be identified (e.g., by the gap analysis and tasking module 130). Since the Template A 502 includes other sub-templates, it may turn out that multiple database records are identified that include different and conflicting information. In the example illustrated in FIG. 7, these different database records may correspond to data GHI that populates the third sub-template 706a in the first instance 702a and data RST that populates the third sub-template 706b of in the second instance 702b. The different database records may, for example, correspond to two different addresses associated with a particular person. Since it may not be immediately clear which address is correct, or whether both addresses are correct, a first address (e.g., corresponding to the data GM) may be used to populate the sub-template 3 in the first instance 702a, and the second instance 702b may be generated with the second address (e.g., corresponding to the data RST) used to populate the sub-template 3 in the second instance 702b. Processing of both instances 702a and 702b may proceed normally. For example, additional gap analysis may be performed related to each instance 702a and 702b. When the gap analysis gathers data that is relevant to both instances 702a and 702b, each instance may be updated.

Although FIG. 7 illustrates an example in which two instance of a template are formed, in some cases more than two instances of the template may be formed. In a particular embodiment, the number of instances of a template that are formed may be limited only by computing capacity of an intelligence analysis system. In another embodiment, a limit on the number of instances of a particular template that can be instantiated may be imposed (e.g., as a threshold). In this embodiment, only a most likely set of instances may be generated. To illustrate, in the example above, if 20 different addresses were associated with a particular person, analysis may be performed to identify which of these addresses are mostly likely correct or to eliminate one or more of these addresses as unlikely to be correct before additional instances of the Template A 502 are generated.

Figure 8:
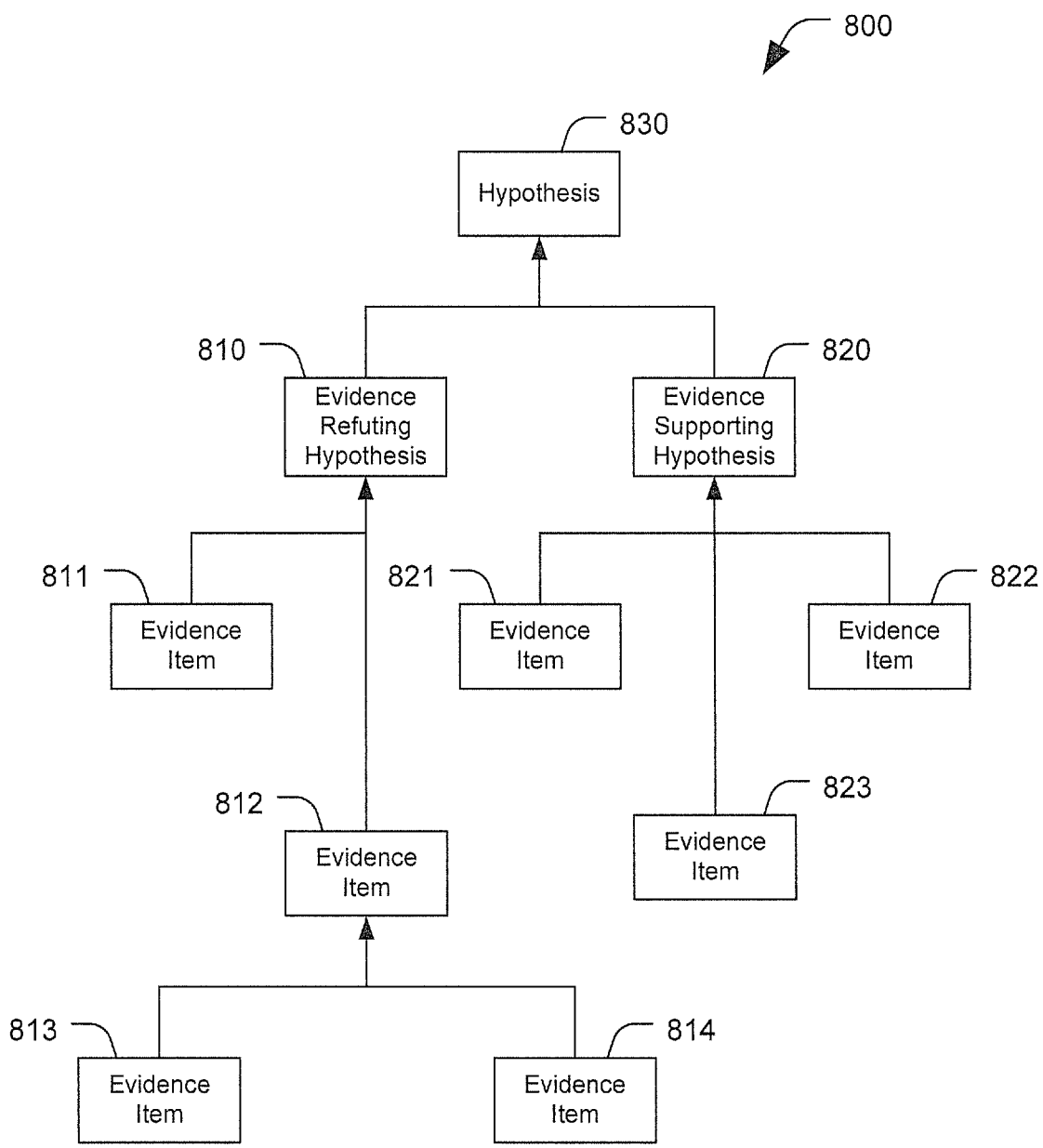
FIG. 8 is a diagram illustrating a fourth method of operation of the intelligence analysis system of FIG. 1 according to a particular embodiment.

FIG. 8 is a diagram illustrating a fourth method of operation of the intelligence analysis system 100 of FIG. 1 according to a particular embodiment. In particular, FIG. 8 illustrates a template 800 for a hypothesis 830 according to a particular embodiment. The template 800 may be instantiated (also referred to herein as generating the hypothesis 830) in response to an intelligence analysis system (such as the intelligence analysis system 100 of FIG. 1) receiving a data element that corresponds to an evidence item that is used by template 800.

The template 800 may include embedded processing (e.g., executable code) to evaluate evidence refuting the hypothesis 810, evidence supporting the hypothesis 820, or both. The embedded processing may identify evidence items, such as evidence items 811-814 and 821-823, and may associate weights, evaluation criteria, evaluation logic, or a combination thereof, with each evidence item. For example, a first evidence item 812 may be related to two or more sub-items, such as a second evidence item 813 and a third evidence item 814. A value associated with the first evidence item 812 may be mathematically or logically determined based on values associated with the second and third evidence items 813, 814.

As an example of a mathematical relationship, values of the second and third evidence items 813, 814 may be numerical values, and the value of the first evidence item may be a function of the values of the second and third evidence items 813, 814. The function may be simple (e.g., a sum, product, quotient, difference, logarithm, exponential, etc.) or may be more complex (e.g., a weighted sum, a weighted product, a weighted quotient, a weighted difference, an average, a result of an equation in which the values of the second and third evidence items 813, 814 are two variables, a look-up table result based on the values of the second and third evidence items 813, 814, etc.).

As an example of a logical relationship, the value of the first evidence item 812 may be a logical value based on the values of the second and third evidence items 813, 814. To illustrate, the value of the first evidence item 812 may be true when the values of the second and third evidence items 813, 814 satisfy a criterion and may be false when the values of the second and third evidence items 813, 814 do not satisfy the criterion.

As an example of a combined mathematical and logical relationship, the value of the first evidence item 812 may be mathematically determined based on logical values of the second and third evidence items 813, 814. To illustrate, when the second evidence item 813 has a logical true value and the third evidence item 814 has a logical true value, a first function may be used to calculate the value of the first evidence item 812; when the second evidence item 813 has a logical false value and the third evidence item 814 has a logical true value, a second function may be used to calculate the value of the first evidence item 812; when the second evidence item 813 has a logical true value and the third evidence item 814 has a logical false value, a third function may be used to calculate the value of the first evidence item 812; and when the second evidence item 813 has a logical false value and the third evidence item 814 has a logical false value, a fourth function may be used to calculate the value of the first evidence item 812. Logical analyses to determine a value of the first evidence item 812 may include, but are not limited to AND, OR, NOT, XOR, NAND, NOR, and XNOR functions.

In a particular embodiment, one or more of the evidence items may be associated with a likelihood value indicating a likelihood (e.g., a probability) that the value of the evidence item is correct. For example, the second evidence item 813 may have a textual value, e.g., a name, and an associated likelihood value that indicates a probability that the name is correct. One or more of the evidence items may also be associated with a confidence value indicating a confidence interval associated with the value of the evidence item. Likelihood values, confidence values, or both, may propagate upwards through the hypothesis 830 according to statistical calculations. For example, a likelihood value, a confidence value, or both, associated with the first evidence item 812 may be determined based on likelihood values and confidence values associated with the second and third evidence items 813, 814. One or more of the evidence items may be associated with a threshold. When a likelihood associated with an evidence item satisfies the threshold, the evidence item may be considered true (e.g., may be associated with a 100% likelihood of being true), which may simplify calculation of likelihood for the hypothesis 830 as a whole.

Just as each of the evidence items 811-814 and 821-823 may be associated with a likelihood value and a confidence value, the hypothesis 830 may be associated with a likelihood value and a confidence value. For example, the likelihood value of the hypothesis may indicate a probability that the hypothesis 830 is correct based on the evidence items 811-814 and 821-823. The hypothesis 830 may also be associated with a threshold. When a likelihood associated with the hypothesis 830 satisfies the threshold, the hypothesis 830 may be considered true, which may cause the intelligence analysis system to output a result or to perform another action, e.g., to instantiate other processing or use output of the hypothesis as evidence in evaluating another hypothesis. The likelihood value and the confidence value of the hypothesis 830 may be determined as a function of the likelihood values and confidence values of the evidence items. A template the defines the hypothesis 830 may include calculations that are to be used to roll up the likelihood values and the confidence value of the evidence items to form the likelihood value and the confidence value of the hypothesis 830. For example, the calculations may specify weights to be used to roll up the values such that particular evidence items are considered more relevant to the assessment of the hypothesis 830 than other evidence items.

In a particular embodiment, gap analysis may be performed based partially on the template 800. For example, the gap analysis and tasking module 130 may generate tasks based on missing evidence items of the hypothesis 830.

Figure 9:
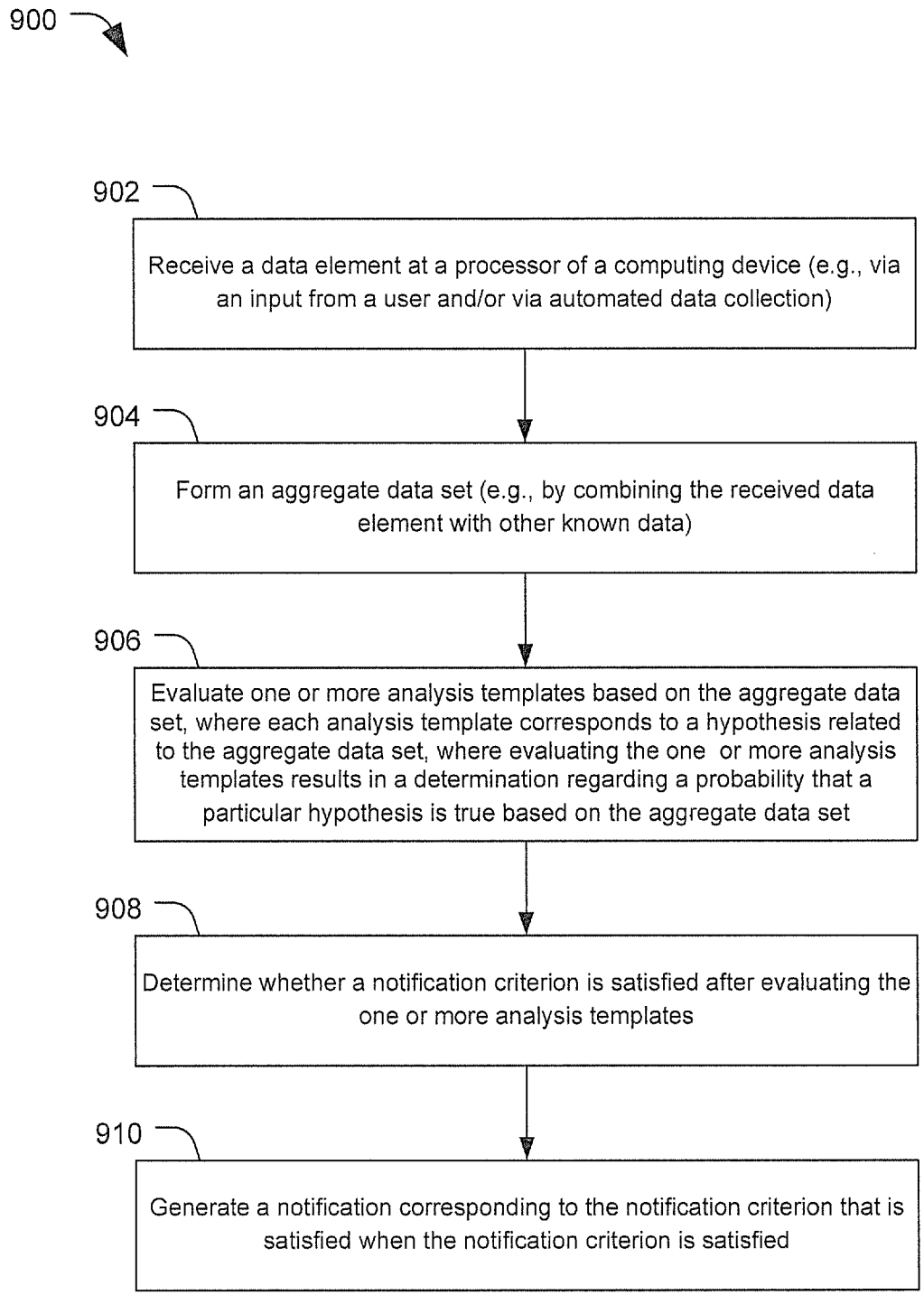
FIG. 9 is a flow chart of a fourth particular embodiment of a method of intelligence analysis.

FIG. 9 is a flow chart of a fourth particular embodiment of a method of intelligence analysis. The method 900 may be performed by an intelligence analysis system, such as the intelligence analysis system 100 of FIG. 1, to provide real-time intelligence analysis regarding persons, groups of persons and associated objects. The method 900 includes, at 902, receiving a data element at a processor of a computing device. The data element may be received via an input from a user, via automated data collection, or a combination thereof.

The method 900 may also include, at 904, forming an aggregate data set, for example, by combining the received data element with other data. To illustrate, when the received data element is related to a particular known data set, the aggregate data set may be formed by combining the received data element with the particular known data set.

The method 900 may include, at 906, evaluating one or more analysis templates based on the aggregate data set. Each analysis template may correspond to a hypothesis related to the aggregate data set, as described with references to FIGS. 5-8. Evaluating the one or more analysis templates may result in a determination regarding a probability that a particular hypothesis is true based on the aggregate data set.

The method may also include, at 908, determining whether a notification criterion is satisfied after evaluating the one or more analysis templates. For example, the notification criterion may be a threshold that is dynamic (e.g., automatically adjusted), fixed, or user configurable. One example of a notification criterion relates to the probability that a particular hypothesis is true. For example, a threshold may be established that indicates that a particular hypothesis is considered true when the probability that the particular hypothesis is true achieves a threshold value. In this example, the notification criterion may be satisfied when the particular hypothesis is considered true. Another example of a notification criterion may relate to missing and/or ambiguous data elements. For example, when missing data that could be used to resolve a conflict or ambiguity is identified, the notification criterion may be satisfied. In particular embodiments, more than one notification criterion may be used and each notification criterion may relate to a different hypothesis or intelligence analysis task or status. The method 900 may also include, at 910, generating a notification corresponding to the notification criterion that is satisfied when the notification criterion is satisfied.

Figure 10:
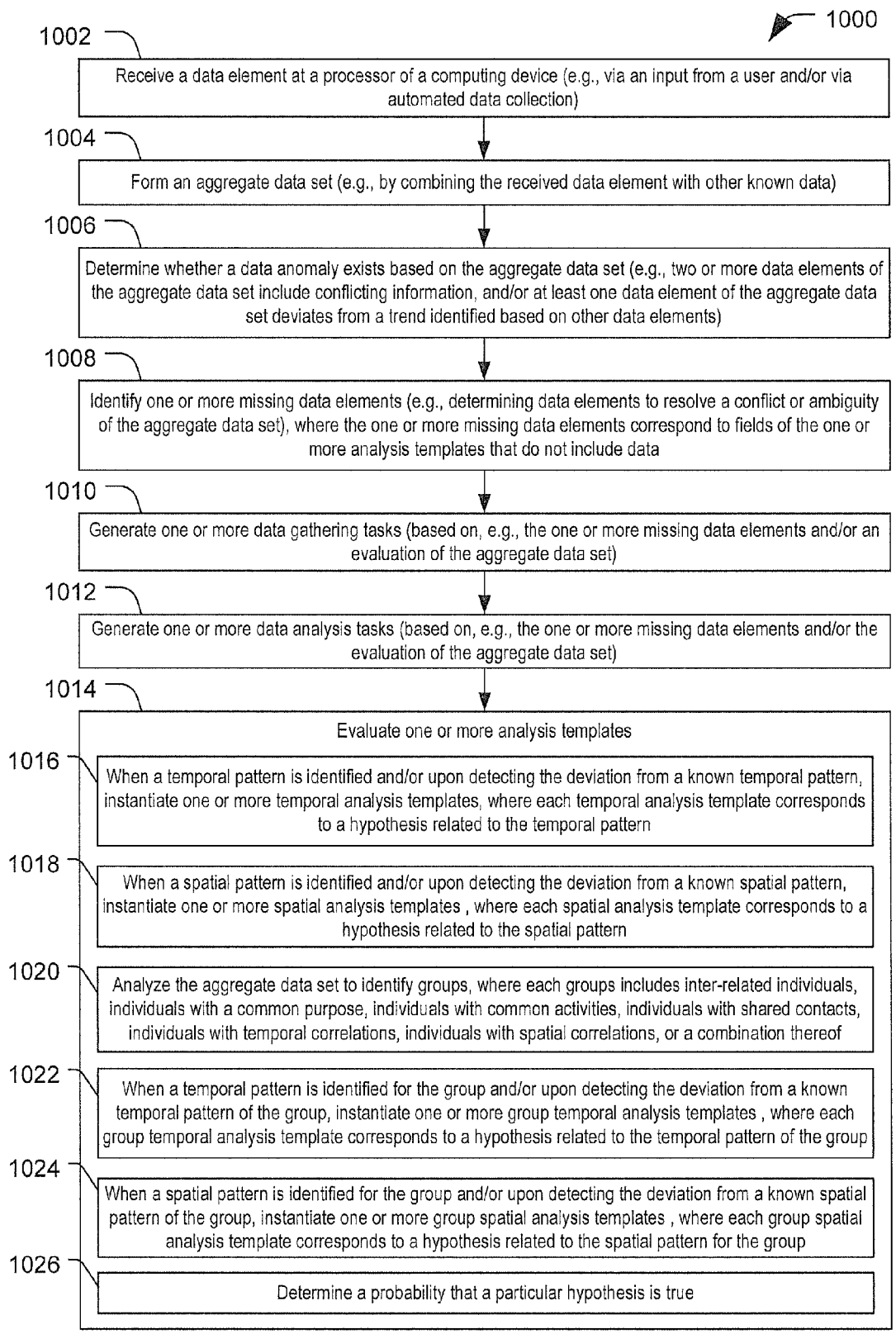
FIG. 10 is a flow chart of a fifth particular embodiment of a method of intelligence analysis.

FIG. 10 is a flow chart of a fifth particular embodiment of a method 1000 of intelligence analysis. The method 1000 may be performed by an intelligence analysis system, such as the intelligence analysis system 100 of FIG. 1, to provide real-time intelligence analysis regarding persons, groups of persons and associated objects.

The method 1000 includes, at 1002, receiving a data element at a processor of a computing device. For example, the data element may be received via an input from a user, via automated data collection, or a combination thereof. In a particular embodiment, when the data element is an unstructured element, attributes are extracted from the unstructured element to form a structured data element. For example, the data element may include text of a news article. In this example, since the news article was not specifically generated for intelligence analysis, the news article may be considered unstructured. Accordingly, the news article may be processed to extract information (e.g., attributes) that is relevant to intelligence analysis.

The method 1000 may include, at 1004, forming an aggregate data set. For example, the received data element may be combined with other known data elements. To illustrate, the intelligence analyzer may determine whether the received data element is related to a known data set corresponding to one or more known data elements stored in a memory. When the received data element is related to a particular known data set, the intelligence analyzer may form the aggregate data set by combining the received data element with the particular known data set. In particular instances, it may not be clear that a data element is related to a known data set. In these instances, the intelligence analyzer may determine a probability that the data element relates to a particular known data set. When the probability exceeds a threshold, the intelligence analyzer may generate an evaluation data set based on an assumption that the data element relates to the particular known data set. When the probability does not exceed the threshold, the intelligence analyzer may conclude that the received data element is not related to the particular known data set and may take action accordingly. For example, a new data set may be formed based on the received data element.

The method 1000 may include, at 1006, determining whether a data anomaly exists based on the aggregate data set. A data anomaly may include two or more data elements of the aggregate data set that include conflicting information, at least one data element of the aggregate data set deviates from a trend identified based on other data elements, at least one data element of the aggregate data set deviates from a societal or generally expected norm, or a combination thereof.

The method 1000 also includes, at 1008, identifying one or more missing data elements. The one or more missing data elements correspond to fields of the one or more analysis templates that do not include data. The one or more missing data elements may be data elements that are selected to resolve an identified conflict or ambiguity of the aggregate data set.

The method 1000 may include, at 1010, generating one or more data gathering tasks. The one or more data gathering tasks may be generated based on the one or more missing data elements, based on the evaluation of the aggregate data set, based on identification of conflicting data, or based on other factors as described above. Alternately, or in addition, the method 1000 may include, at 1012, generating one or more data analysis tasks. The one or more data analysis tasks may be generated based on the one or more missing data elements, based on the evaluation of the aggregate data set, based on identification of conflicting data, or based on other factors as described above.

The method 1000 may also include, at 1014, evaluating one or more analysis templates. Evaluating the one or more analysis templates may include temporal analysis, spatial analysis, group analysis, other analysis, or a combination thereof. For example, evaluating the one or more analysis templates may include, at 1016, instantiating one or more temporal analysis templates based on a temporal pattern when the temporal pattern is identified, upon detecting the deviation from a known temporal pattern, or both. Each temporal analysis template may correspond to a hypothesis related to the temporal pattern.

In another example, evaluating the one or more analysis templates may include, at 1018, instantiating one or more spatial analysis templates based on a spatial pattern when the spatial pattern is identified, upon detecting the deviation from a known spatial pattern, or both. Each spatial analysis template may correspond to a hypothesis related to the spatial pattern.

In another example, evaluating the one or more analysis templates may include, at 1020, analyze the aggregate data set to identify groups. A group may include inter-related individuals, individuals with a common purpose, individuals with common activities, individuals with shared contacts, individuals with temporal correlations, individuals with spatial correlations, or a combination thereof. Groups may be analyzed for spatial and/or temporal patterns as well. For example, evaluating the one or more analysis templates may include, at 1022, instantiating one or more group temporal analysis templates when a temporal pattern is identified for a group and/or upon detecting the deviation from a known temporal pattern of the group. Each group temporal analysis template corresponds to a hypothesis related to the temporal pattern of the group. In another example, evaluating the one or more analysis templates may include, at 1024, instantiating one or more group spatial analysis templates when a spatial pattern is identified for a group and/or upon detecting the deviation from a known spatial pattern of the group. Each group spatial analysis template corresponds to a hypothesis related to the spatial pattern of the group.

Evaluating the one or more analysis templates may also include, at 1026, determining a probability that a particular hypothesis is true or correct. Although not shown in FIG. 10, the method 1000 may include determining whether a notification criterion is satisfied and generating a notification when the notification criterion is satisfied.

Thus, embodiments disclosed herein provide real-time situation and threat assessment by evaluation of means, motive, opportunity and other suspicion factors for individuals and groups of individuals. The assessment includes evaluations of relevant inanimate objects, such as vehicles. The assessment may also include evaluation of behavioral and observational data such as is typically used by law enforcement professionals monitoring an area. The intelligence analysis may be performed in a manner that simulates or models intelligence analysis performed by a human analyst by use of templates that model assessment patterns used by expert human analysts.

Figure 11:
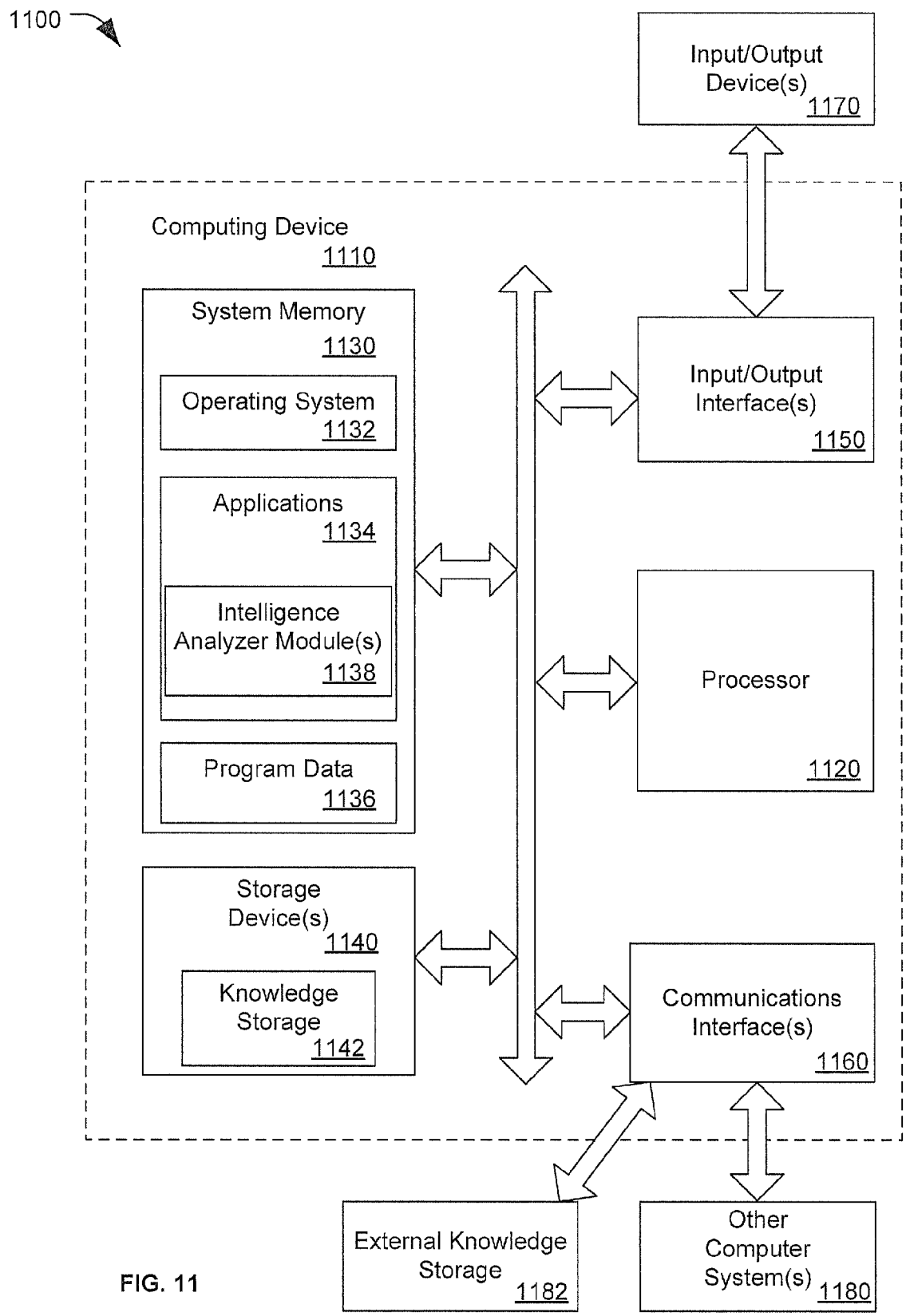
FIG. 11 is a block diagram of a computing environment including a general purpose computing device operable to support embodiments of computer-implemented methods and computer-executable program instructions (or code) for intelligence analysis.

FIG. 11 is a block diagram of a computing environment 1100 including a general purpose computing device 1110 operable to support embodiments of computer-implemented methods and computer-executable program instructions (or code) for intelligence analysis. For example, the computing device 1110, or portions thereof, may be operable to provide real-time intelligence analysis regarding persons, groups of persons and associated objects and locations by evaluating one or more analysis templates, where evaluating the one or more analysis templates results in a determination regarding a probability that a particular hypothesis is true.

The computing device 1110 may include at least one processor 1120. Within the computing device 1110, the at least one processor 1120 may communicate with a system memory 1130, one or more storage devices 1140, one or more input/output interfaces 1150, one or more communications interfaces 1160, or a combination thereof.

The system memory 1130 may include volatile memory devices (e.g., random access memory (RAM) devices), nonvolatile memory devices (e.g., read-only memory (ROM) devices, programmable read-only memory, and flash memory), or both. The system memory 1130 may include an operating system 1132, which may include a basic/input output system for booting the computing device 1110 as well as a full operating system to enable the computing device 1110 to interact with users, other programs, and other devices. The system memory 1130 also typically includes one or more application programs 1134, one or more intelligence analyzer modules 1138. In a particular embodiment, the one or more intelligence analyzer modules 1138 correspond to one or more of the functional modules of FIG. 1. The system memory 1130 also may include program data 1136. The program data 1136 may include data used by the applications 1134 to perform respective functions of the applications 1134.

The processor 1120 may also communicate with one or more storage devices 1140. For example, the one or more storage devices 1140 may include nonvolatile storage devices, such as magnetic disks, optical disks, or flash memory devices. The storage devices 1140 may include both removable and non-removable memory devices. The storage devices 1140 may be configured to store an operating system, applications and program data. In a particular embodiment, the system memory 1130, the storage devices 1140, or both, include tangible, non-transitory computer-readable media. The storage devices 1140 may include a local data source, such as knowledge storage 1142 (e.g., an internal database).

The processor 1120 may also communicate with one or more input/output interfaces 1150 that enable the computing device 1110 to communicate with one or more input/output devices 1170 to facilitate user interaction. The input/output interfaces 1150 may include serial interfaces (e.g., universal serial bus (USB) interfaces or IEEE 1394 interfaces), parallel interfaces, display adapters, audio adapters, and other interfaces. The input/output devices 1170 may include keyboards, pointing devices, displays, speakers, microphones, touch screens, and other devices.

The processor 1120 may communicate with other computer systems 1180 and/or external knowledge storage 1182 (e.g., an external database) via the one or more communications interfaces 1160. The one or more communications interfaces 1160 may include wired Ethernet interfaces, IEEE 802 wireless interfaces, Bluetooth communication interfaces, electrical, optical or radio frequency interface, or other network interfaces. The other computer systems 1180 may include host computers, servers, workstations, and other computing devices.

Embodiments described above illustrate but do not limit the disclosure. It should also be understood that numerous modifications and variations are possible in accordance with the principles of the present disclosure. Accordingly, the scope of the disclosure is defined only by the following claims.

The illustrations of the embodiments described herein are intended to provide a general understanding of the structure of the various embodiments. The illustrations are not intended to serve as a complete description of all of the elements and features of apparatuses and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. In another example, particular method steps may be performed in parallel with one another rather than sequentially. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A method of providing real-time intelligence analysis regarding persons, groups of persons and associated objects and locations, the method comprising:
   receiving a data element at a processor of a computing device;
   determining, using the processor, whether the data element is related to a known data set corresponding to one or more known data elements stored in a memory accessible to the processor;
   when the data element is related to a particular known data set, forming an aggregate data set by combining the data element with the particular known data set; and
   evaluating, using the processor, one or more analysis templates based on the aggregate data set, each analysis template corresponding to a different hypothesis, wherein evaluating the one or more analysis templates results in a determination regarding a probability that a particular hypothesis is true based on the aggregate data set.

2. The method of claim 1, further comprising generating one or more data gathering tasks based on evaluation of the aggregate data set.

3. The method of claim 1, further comprising generating one or more data analysis tasks based on evaluation of the aggregate data set.

4. The method of claim 1, further comprising determining whether a data anomaly exists based on the aggregate data set.

5. The method of claim 4, wherein the data anomaly exists when two or more data elements of the aggregate data set include conflicting information.

6. The method of claim 4, wherein the data anomaly exists when at least one data element of the aggregate data set deviates from a trend identified based on other data elements.

7. The method of claim 1, further comprising identifying one or more missing data elements, wherein the one or more missing data elements correspond to fields of the one or more analysis templates that do not include data.

8. The method of claim 7, further comprising generating one or more data gathering tasks based on the one or more missing data elements.

9. The method of claim 7, further comprising generating one or more data analysis tasks based on the one or more missing data elements.

10. The method of claim 7, wherein identifying one or more missing data elements includes determining data elements to resolve an identified conflict or ambiguity of the aggregate data set.

11. The method of claim 1, further comprising:
    after evaluating the one or more analysis templates, determining whether a notification criterion is satisfied; and
    when the notification criterion is satisfied, generating a notification corresponding to the notification criterion that is satisfied.

12. The method of claim 1, wherein the data element is received via an input from a user.

13. The method of claim 1, wherein the data element is received via automated data collection.

14. The method of claim 1, wherein, when the data element is an unstructured element, attributes are extracted from the unstructured element to form a structured data element.

15. The method of claim 1, further comprising:
    determining a type of information of the data element; and
    routing the aggregate data set for analysis based on the type of the information.

16. The method of claim 15, wherein the type of the information includes information related to a person, information related to an object, or information related to a location.

17. The method of claim 1, wherein determining whether the data element is related to the particular known data set includes:
    determining a second probability that the data element relates to the particular known data set; and
    when the second probability exceeds a threshold, generating an evaluation data set based on an assumption that the data element relates to the particular known data set.

18. The method of claim 1, further comprising determining whether a temporal pattern exists based on temporal aspects of the aggregate data set.

19. The method of claim 18, further comprising, when the temporal pattern is determined to exist, instantiating one or more temporal analysis templates based on the temporal pattern, wherein each temporal analysis template corresponds to a distinct hypothesis related to the temporal pattern.

20. The method of claim 1, further comprising detecting a deviation from a known temporal pattern based on temporal aspects of the aggregate data set.

21. The method of claim 20, further comprising, upon detecting the deviation from the known temporal pattern, instantiating one or more temporal analysis templates based on the known temporal pattern, wherein each temporal analysis template corresponds to a distinct hypothesis related to the deviation from the known temporal pattern.

22. The method of claim 1, further comprising determining whether a spatial pattern exists based on spatial aspects of the aggregate data set.

23. The method of claim 22, further comprising, when the spatial pattern is determined to exist, instantiating one or more spatial analysis templates based on the spatial pattern, wherein each spatial analysis template corresponds to a distinct hypothesis related to the spatial pattern.

24. The method of claim 1, further comprising detecting a deviation from a known spatial pattern based on spatial aspects of the aggregate data set.

25. The method of claim 24, further comprising, upon detecting the deviation from the known spatial pattern, instantiating one or more spatial analysis templates based on the known spatial pattern, wherein each spatial analysis template corresponds to a distinct hypothesis related to the deviation from the known spatial pattern.

26. The method of claim 1, further comprising analyzing the aggregate data set to identify groups, wherein each of the groups includes inter-related individuals, individuals with a common purpose, individuals with common activities, individuals with shared contacts, individuals with temporal correlations, individuals with spatial correlations, or a combination thereof.

27. The method of claim 26, further comprising determining whether a temporal pattern exists based on temporal aspects of a particular data set related to an identified group.

28. The method of claim 26, further comprising determining whether a spatial pattern exists based on spatial aspects of a particular data set related to an identified group.

29. A non-transitory computer-readable medium comprising instructions that are executable by a processor to cause the processor to:
- determine whether a received data element is related to a known data set corresponding to one or more known data elements stored in a memory accessible to the processor;
- when the received data element is related to a particular known data set, form an aggregate data set by combining the received data element with the particular known data set; and
- evaluate one or more analysis templates based on the aggregate data set, each analysis template corresponding to a different hypothesis, wherein evaluating the one or more analysis templates results in a determination regarding a probability that a particular hypothesis is true based on the aggregate data set.

30. A system comprising:
a processor; and
a memory accessible to the processor, the memory storing instructions that are executable by the processor to cause the processor to:
- determine whether a received data element is related to a known data set corresponding to one or more known data elements stored in the memory;
- when the received data element is related to a particular known data set, form an aggregate data set by combining the received data element with the particular known data set; and
- evaluate one or more analysis templates based on the aggregate data set, each analysis template corresponding to a different hypothesis related to the aggregate data set, wherein evaluating the one or more analysis templates results in a determination regarding a probability that a particular hypothesis is true based on the aggregate data set.

* * * * *